(12) United States Patent
Mikasa

(10) Patent No.: US 10,737,590 B2
(45) Date of Patent: Aug. 11, 2020

(54) CLUTCH UNIT FOR VEHICLES

(71) Applicant: SHIROKI CORPORATION, Fujisawa-shi (JP)

(72) Inventor: Kunihiro Mikasa, Fujisawa (JP)

(73) Assignee: SHIROKI CORPORATION, Fujisawa-Shi, Kanagawa (JP)

(*) Notice: Subject to any disclaimer, the term of this patent is extended or adjusted under 35 U.S.C. 154(b) by 101 days.

(21) Appl. No.: 15/781,452

(22) PCT Filed: Nov. 25, 2016

(86) PCT No.: PCT/JP2016/085066
§ 371 (c)(1),
(2) Date: Jun. 4, 2018

(87) PCT Pub. No.: WO2017/104385
PCT Pub. Date: Jun. 22, 2017

(65) Prior Publication Data
US 2018/0345826 A1 Dec. 6, 2018

(30) Foreign Application Priority Data

Dec. 18, 2015 (JP) .................................. 2015-247655
Jul. 28, 2016 (JP) .................................. 2016-148811

(51) Int. Cl.
F16D 15/00 (2006.01)
B60N 2/16 (2006.01)
(Continued)

(52) U.S. Cl.
CPC ........... *B60N 2/1615* (2013.01); *B60N 2/165* (2013.01); *B60N 2/1685* (2013.01); *B60N 2/933* (2018.02);
(Continued)

(58) Field of Classification Search
CPC .... B60N 2/1615; B60N 2/933; B60N 2/1685; B60N 2/165; F16D 41/066; F16D 15/00; F16D 2041/0608
See application file for complete search history.

(56) References Cited

U.S. PATENT DOCUMENTS 6,688,443 B2 * 2/2004 Liu .......................... G05G 5/06
192/15
6,691,851 B2 * 2/2004 Liu ...................... B60N 2/2354
192/223.2
(Continued)

FOREIGN PATENT DOCUMENTS

JP 2002-045254 A 2/2002
JP 2008-296856 A 12/2008
(Continued)

OTHER PUBLICATIONS

International Search Report (ISR) (PCT Form PCT/ISA/210), in PCT/JP2016/085066, dated Jan. 31, 2017, and English translation thereof.
(Continued)

Primary Examiner — David J Hlavka
(74) Attorney, Agent, or Firm — McGinn IP Law Group, PLLC

(57) ABSTRACT

A clutch unit, which transmits an operational force input to an operating lever to an output shaft member via an input-side clutch and an output-side clutch and outputs the operational force to a vehicle seat, includes a rotation suppressing member is provided which applies a rotational resistance force larger than a co-rotating force to between an input-side outer-ring member and a housing which is not rotated at a time of the returning operation of the operating lever, so as to suppress that the input-side outer-ring member is co-rotated by an input-side inner-ring member of the input-side
(Continued)

clutch at the time of the returning operation of the operating lever.

8 Claims, 13 Drawing Sheets

(51) Int. Cl.
    *B60N 2/90*         (2018.01)
    *F16D 41/066*     (2006.01)
    *F16D 41/06*      (2006.01)

(52) U.S. Cl.
    CPC ........... *F16D 15/00* (2013.01); *F16D 41/066* (2013.01); *F16D 2041/0608* (2013.01)

(56) References Cited

U.S. PATENT DOCUMENTS

| | | | | |
|---|---|---|---|---|
| 8,132,658 | B2* | 3/2012 | Kawai | B60N 2/1615 192/223.2 |
| 8,678,154 | B2* | 3/2014 | Kim | B60N 2/167 192/38 |
| 8,882,198 | B2* | 11/2014 | Gillis | F16H 31/002 297/344.12 |
| 2002/0043849 | A1 | 4/2002 | Denis | |
| 2006/0278774 | A1* | 12/2006 | Garnier | B60N 2/2257 248/157 |
| 2011/0266851 | A1 | 11/2011 | Kim | |
| 2015/0001033 | A1 | 1/2015 | Kaku | |

FOREIGN PATENT DOCUMENTS

| | | |
|---|---|---|
| JP | 2010-127418 A | 6/2010 |
| JP | 2011-235871 A | 11/2011 |
| JP | 2013-133868 A | 7/2013 |
| JP | 2015-067014 A | 4/2015 |

OTHER PUBLICATIONS

Written Opinion of the International Searching Authority (PCT Form PCT/ISA/237), in PCT/JP2016/085066, dated Jan. 31, 2017.
Japanese Office Action, dated Jun. 9, 2020, in Japanese Application No. 2016-148812.

* cited by examiner

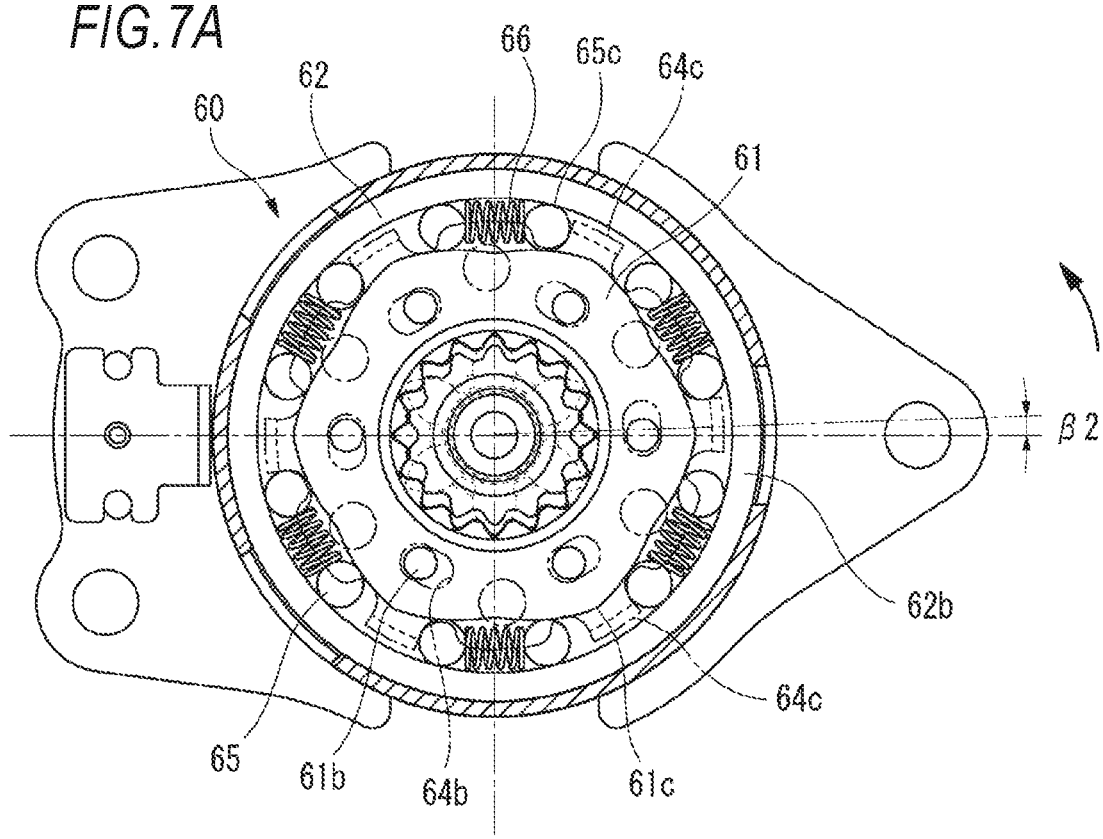
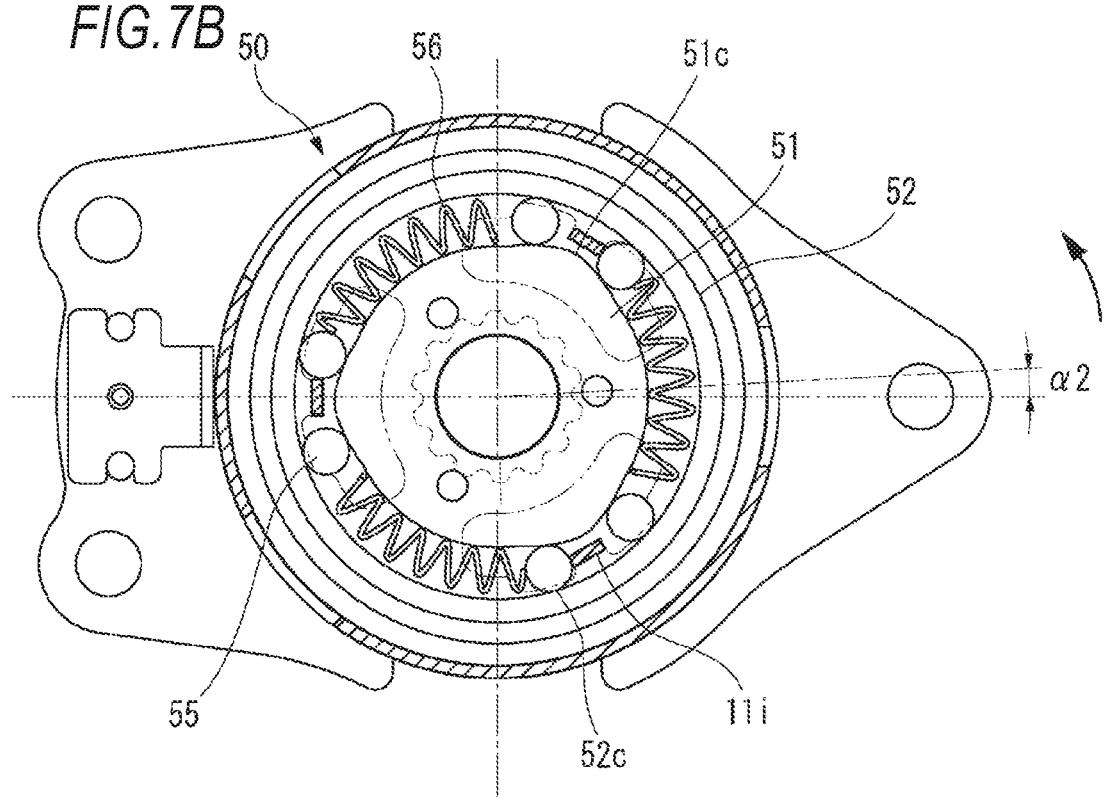

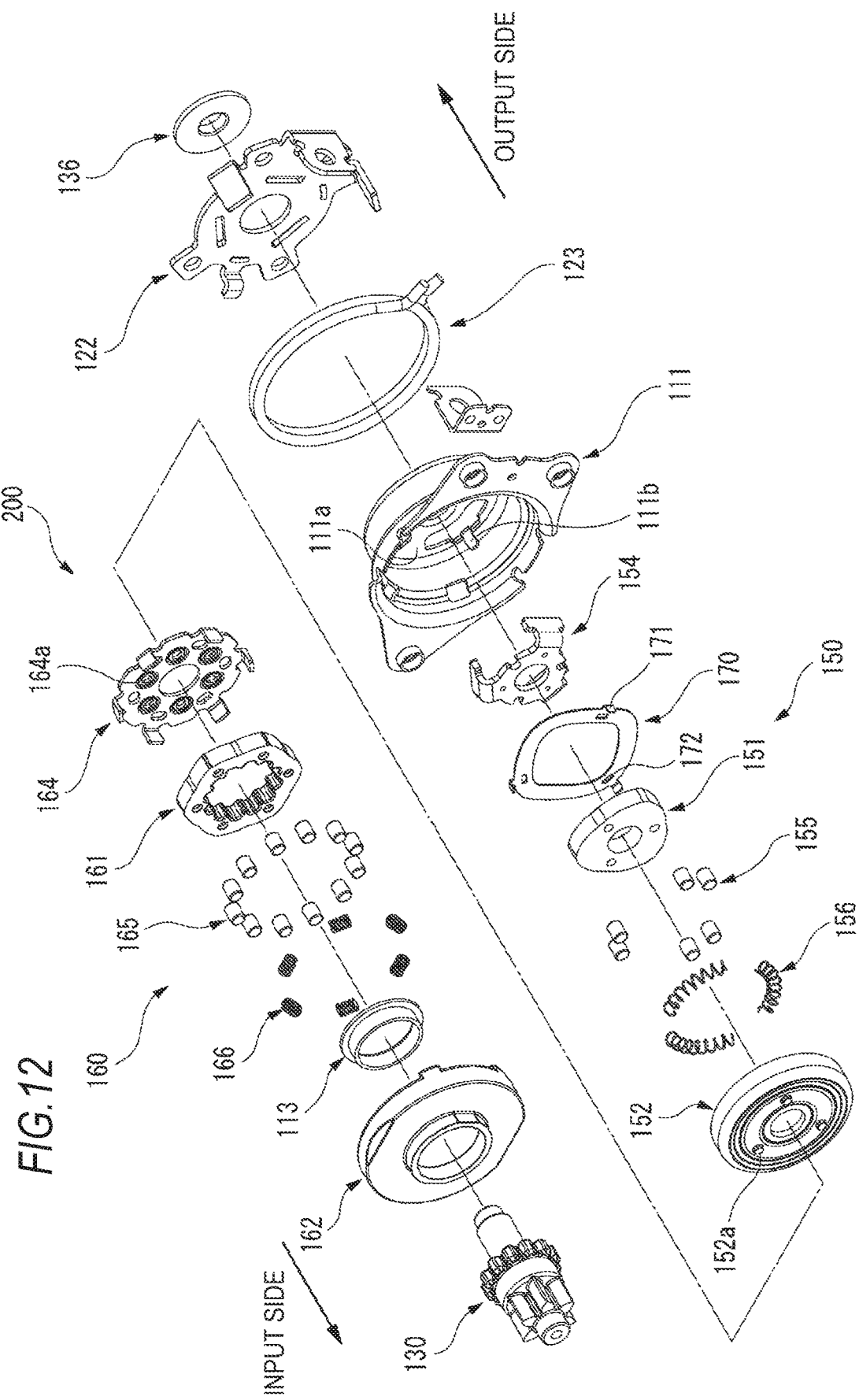

CLUTCH UNIT FOR VEHICLES

TECHNICAL FIELD

The present invention relates to a clutch unit for a vehicle.

BACKGROUND ART

In Patent Literature 1 and the like, a vehicle seat lifter is known which lifts and lowers a seat of a vehicle such as an automobile by operating an operating lever. The vehicle seat lifter includes a clutch unit which transmits a rotation torque input from the operating lever to an output side as a seat side.

CITATION LIST

Patent Literature

[Patent Literature 1]: Japanese Unexamined Patent Application Publication No. 2010-127418

SUMMARY OF THE INVENTION

Technical Problem

Incidentally, the present inventor has found that a vehicle clutch unit used in the above-described seat lifter has a room for improving a responsiveness of a displacement of the seat with respect to the operation of the operating lever.

The present invention provides a vehicle clutch unit in which the responsiveness of displacement of a vehicle seat with respect to the operation of an operating lever is further improved.

Solution to Problem

A clutch unit for a vehicle seat includes:

an operating lever, which is rotatable about a rotational shaft and is returnable to a neutral position;

an output shaft member, which is rotatable about the rotational shaft and outputs an operational force input to the operating lever to the vehicle seat;

an input-side clutch, which includes: an inner-ring member and an outer-ring member that are provided coaxially with the rotational shaft and into which the output shaft member is inserted; and an input-side transmission member that is arranged between an outer circumferential surface of the inner-ring member and an inner circumferential surface of the outer-ring member; and an output-side clutch, the input-side clutch is configured to transmit a rotation of the operating lever to the output-side clutch in such a manner that one member of the inner-ring member and the outer-ring member is rotated with the rotation of the operating lever, and the other member of the inner-ring member and the outer-ring member is rotated via the input-side transmission member, input the rotation of the operating lever to the output-side clutch at a time of a driving operation in which the operating lever is driven from the neutral position, and return the operating lever to the neutral position while holding a rotation position of the output shaft member at a time of a returning operation in which the operating lever returns to the neutral position after being driven, wherein the output-side clutch is configured to regulate the rotation of the output shaft member due to a force input to the output shaft member from a vehicle seat side, and allow the rotation of the output shaft member in response to that the rotation of the operating lever is transmitted by the other member of the input-side clutch, and a rotation suppressing member is provided to apply a rotational resistance force larger than a co-rotating force to between the other member and a member which is not rotated at the time of the returning operation of the operating lever, so as to suppress the other member from co-rotating by the one member at the time of the returning operation of the operating lever to the neutral position.

According to the vehicle clutch unit configured as above, it is regulated that the other member is rotated at the time of the returning operation of the operating lever to the neutral position. Thus, it is suppressed that the other member is rotated in a non-transmitting direction by the returning operation of the operating lever after the other member is rotated in a transmitting direction to transmit the rotation of the operating lever to the output-side clutch. Accordingly, an operability of the continuous operation of the operating lever is improved.

The vehicle clutch unit according to the present invention may further include:

a bottomed cylindrical housing, which accommodates the input-side clutch, wherein the rotation suppressing member may push the other member toward a bottom surface of the housing.

According to the vehicle clutch unit configured as above, it is possible to prevent a rattling of the other member in the rotational axial direction. As described above, the rotation suppressing member also serves to function as a pushing member such as a spring for preventing the rattling, and the number of the components can be reduced compared to a case where the pushing member is provided additionally.

In the vehicle clutch unit according to the present invention, the other member may include a rotation transmitting part, which is rotated together with the other member to transmit the rotation to the output-side clutch, and the rotation suppressing member may push the rotation transmitting part toward an output side in a rotational axial direction.

According to the vehicle clutch unit configured as above, when the rotation suppressing member biases the rotation transmitting part in the rotational axial direction, the engaging margin of the rotation transmitting part and the output-side clutch can be increased to more reliably release the locking of the output-side clutch.

The vehicle clutch unit according to the present invention may further include:

a bottomed cylindrical housing, which accommodates the input-side clutch, wherein the rotation suppressing member may push the other member toward a bottom surface of the housing, and the rotation suppressing member may be positioned between the other member and the rotation transmitting part.

According to the vehicle clutch unit configured as above, the rotation suppressing member is positioned between the other member and the rotation transmitting part. For this reason, a structure is easily formed that the rotation suppressing member pushes the input-side clutch toward the bottom surface of the housing, and pushes the rotation transmitting part to the output side in the rotational axial direction.

In the vehicle clutch unit according to the present invention, the output-side clutch may include an output-side inner-ring member and an output-side outer-ring member, which are provided coaxially with the rotational shaft, an output-side transmission member, which is arranged between an outer circumferential surface of the output-side inner-ring member and an inner circumferential surface of the output-side outer-ring member, and an elastic member, which is arranged between the outer circumferential surface of the output-side inner-ring member and the inner circumferential surface of the output-side outer-ring member, and generates an elastic force which pushes the output-side transmission member such that the output-side transmission member moves together with the rotation transmitting part at the time of the returning operation of the operating lever to the neutral position.

According to the vehicle clutch unit configured as above, the output-side transmission member can be pushed by the elastic member to the rotation transmitting part without clearance. Accordingly, the responsiveness of the displacement of the vehicle seat with respect to the operation of the operating lever can be further improved easily.

The vehicle clutch unit according to the present invention may further include:

a bottomed cylindrical housing, which accommodates the input-side clutch, wherein the other member of the inner-ring member and the outer-ring member may include a rotation transmitting part, which is provided integrally or separately and is rotated together with the other member to transmit the rotation of the other member to the output-side clutch, and the rotation suppressing member may be arranged between the other member and a bottom surface of the housing, and push the other member toward the output-side clutch.

According to the vehicle clutch unit configured as above, the rotation transmitting part can be pushed toward the output-side clutch. For this reason, it is possible to sufficiently secure the engaging margin of the output-side clutch and the rotation transmitting part.

In the vehicle clutch unit according to the present invention, the rotation suppressing member may include a suppression part which is capable of abutting on an outer circumferential surface of the other member and suppresses a radial relative movement of the rotation suppressing member and the other member.

According to the vehicle clutch unit configured as above, the rotation suppressing member can be positioned radially with respect to the other member.

In the vehicle clutch unit according to the present invention, the rotation suppressing member may be a wave washer having a crest part and a valley part along a circumferential direction, the input-side clutch may include a roller which is provided between the inner-ring member and the outer-ring member and transmits a rotational movement between the inner-ring member and the outer-ring member, and the roller may be arranged to be overlapped with the crest part of the rotation suppressing member in an axial direction.

According to the vehicle clutch unit configured as above, the rotation suppressing member also functions as a member for positioning the roller in the circumferential direction, and thus the number of the components can be reduced compared to a case where the member for positioning the roller in the circumferential direction is provided additionally.

In the vehicle clutch unit according to the present invention, the rotation suppressing member and the housing may include an engagement structure in which the rotation suppressing member and the housing are engaged to each other to regulate a relative displacement of the rotation suppressing member and the housing in the circumferential direction.

According to the vehicle clutch unit configured as above, it can be regulated that the rotation suppressing member is relatively rotated with respect to the housing. For this reason, the rotation of the rotation suppressing member itself is regulated, and thus the responsiveness of the displacement of the vehicle seat with respect to the operation of the operating lever is improved easily.

Advantageous Effects of the Invention

According to the present invention, the vehicle clutch unit can be provided in which the responsiveness of the displacement of the vehicle seat with respect to the operation of the operating lever is further improved.

BRIEF DESCRIPTION OF THE DRAWINGS

FIGS. 5A and 5B are views illustrating an internal operation of the vehicle clutch unit, wherein FIG. 5A is a cross-sectional view taken along line B-B in FIG. 3 and FIG. 5B is a cross-sectional view taken along line C-C in FIG. 3.

FIGS. 6A and 6B are views illustrating the internal operation of the vehicle clutch unit, wherein FIG. 6A is a cross-sectional view taken along line B-B in FIG. 3 and FIG. 6B is a cross-sectional view taken along line C-C in FIG. 3.

FIGS. 7A and 7B are views illustrating the internal operation of the vehicle clutch unit, wherein FIG. 7A is a cross-sectional view taken along line B-B in FIG. 3 and FIG. 7B is a cross-sectional view taken along line C-C in FIG. 3.

FIGS. 8A and 8B are views illustrating the internal operation of the vehicle clutch unit, wherein FIG. 8A is a cross-sectional view taken along line B-B in FIG. 3 and FIG. 8B is a cross-sectional view taken along line C-C in FIG. 3.

FIG. 9A is a cross-sectional view taken along line B-B in FIG. 3 and FIG. 9B is a cross-sectional view taken along line C-C in FIG. 3.

FIG. 10A is a cross-sectional view taken along line B-B in FIG. 3 and FIG. 10B is a cross-sectional view taken along line C-C in FIG. 3.

FIG. 11A is a cross-sectional view taken along line B-B in FIG. 3 and FIG. 11B is a cross-sectional view taken along line C-C in FIG. 3.

FIG. 12 is an exploded perspective view illustrating a vehicle clutch unit according to a modification of the present invention.

DESCRIPTION OF EMBODIMENTS

Hereinafter, an embodiment of a vehicle clutch unit according to the present invention will be described with reference to the drawings.

Figure 1:
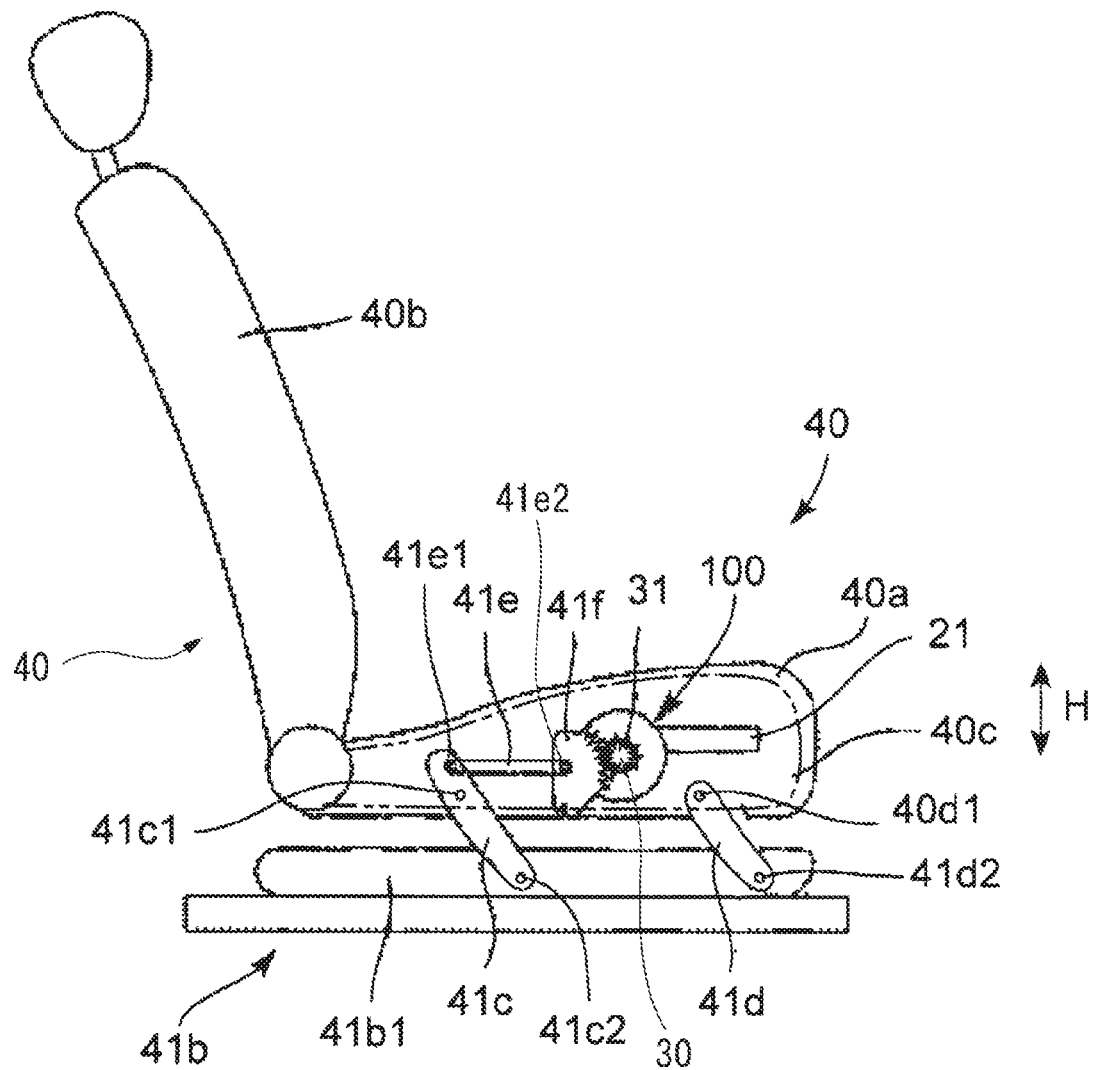
FIG. 1 is a side view illustrating a state where a vehicle clutch unit according to an embodiment is applied to a vehicle seat lifter.

FIG. 1 is a side view illustrating a state where a vehicle clutch unit according to this embodiment is applied to a vehicle seat lifter. As illustrated in FIG. 1, a vehicle clutch unit 100 according to this embodiment is used in a vehicle seat 40. The vehicle seat 40 includes a sitting seat 40a, a back rest 40b, and a seat frame 40c. The vehicle clutch unit 100 is fixed in the seat frame 40c of the sitting seat 40a. The vehicle seat lifter 41 is mounted in the vehicle seat 40. The vehicle seat lifter 41 includes a vehicle clutch unit 100.

The vehicle seat lifter 41 includes a sector gear 41f and a link mechanism. The vehicle clutch unit 100 includes an operating lever 21 which is operated to be rotated positively and reversely. A pinion gear 31 integral with an output shaft member 30 which is driven to be rotated positively and reversely by the operating lever 21 is engaged with the sector gear 41f of the vehicle seat lifter 41.

The link mechanism includes a first link member 41c which extends substantially vertically, a second link member 41d which extends substantially vertically, and a third link member 41e which extends substantially lateral direction.

The upper portion of the first link member 41c and the upper portion of the second link member 41d are connected rotatably about shaft members 41c1 and 41d1 with the seat frame 40c, respectively. The lower portion of the first link member 41c and the lower portion of the second link member 41d are connected rotatably about shaft members 41c2 and 41d2 with a slidable member 41b1 of a seat slide adjuster 41b, respectively.

One end of the third link member 41e is connected with the first link member 41c by the shaft member 41e1 above the shaft member 41c1. The other end of the third link member 41e is connected rotatably about the shaft member 41e2 with the sector gear 41f.

As illustrated in FIG. 1, when the operating lever 21 is rotated counterclockwise (upward), an input torque (rotational force) of the rotational direction is transmitted to the pinion gear 31 through the clutch unit 100, and the pinion gear 31 is rotated counterclockwise. Then, the sector gear 41f engaged with the pinion gear 31 is rotated clockwise, and the third link member 41e pulls the upper portion of the first link member 41c upward. As a result, the first link member 41c and the second link member 41d are erected together, and the sitting surface of the sitting seat 40a is lifted.

In this manner, the operator adjusts a height H of the sitting seat 40a. Then, when the operator opens the force input to the operating lever 21, the operating lever 21 is clockwise rotated to return to an original position (in the following description, referred to as a neutral position or a neutral state).

In addition, in a case where the operating lever 21 is operated to be rotated clockwise (downward), the sitting surface of the sitting seat 40a is lowered by a reverse operation to the above-described operation. In addition, when the operating lever 21 is opened after the height adjustment, the operating lever 21 is rotated counterclockwise to return to the original position (the neutral position or the neutral state).

Further, in a state where the operating lever 21 is opened, the vehicle clutch unit 100 applies a brake to the rotation of the output shaft member 30 (pinion gear 31), so as to prevent the movement even when a vertical force is applied to the sitting seat 40a.

<Vehicle Clutch Unit>

Next, the vehicle clutch unit 100 according to this embodiment will be described. Components of the clutch unit 100 which will be described below are basically made of metal unless otherwise noted.

Figure 2:
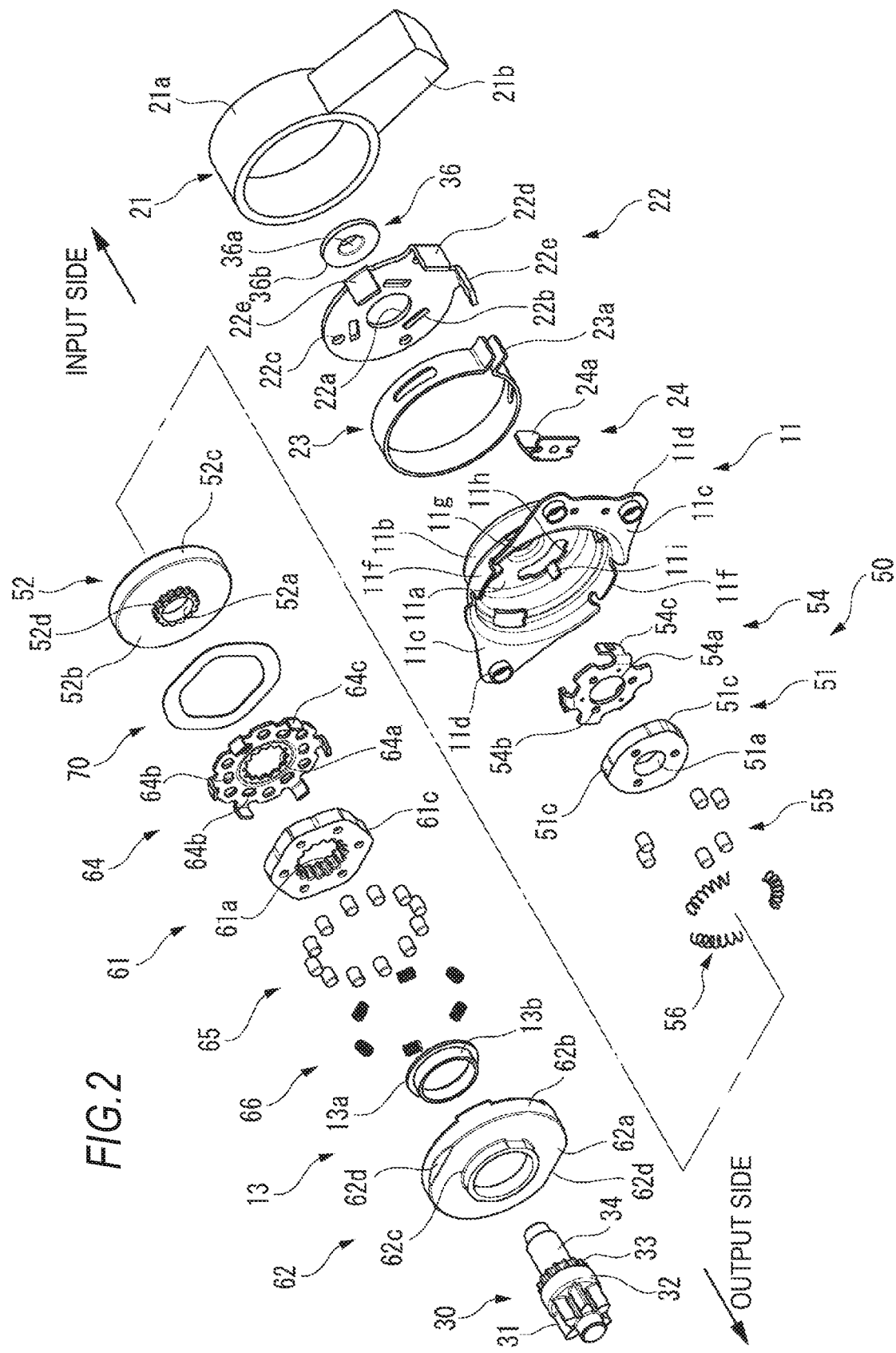
FIG. 2 is an exploded perspective view of the vehicle clutch unit according to the embodiment.
Figure 3:
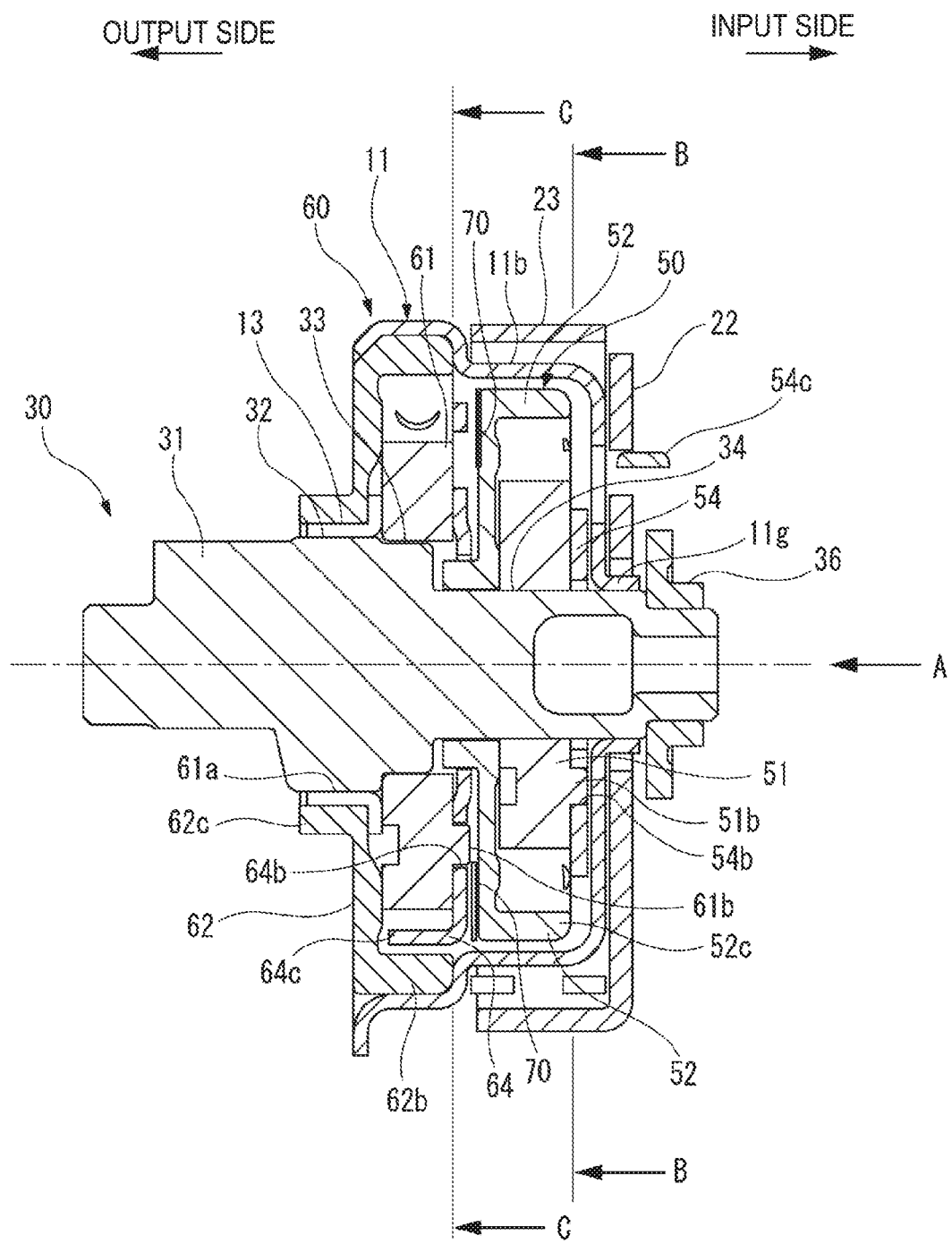
FIG. 3 is a cross-sectional view of the vehicle clutch unit according to the embodiment taken along in an axial direction.

FIG. 2 is an exploded perspective view of the vehicle clutch unit 100. FIG. 3 is a cross-sectional view of the vehicle clutch unit 100 when viewed along the axial direction. As illustrated in FIGS. 2 and 3, the vehicle clutch unit 100 includes the operating lever 21, an output shaft member 30, an input-side clutch 50, an output-side clutch 60, and a housing 11.

The input-side clutch 50 is driven (operated) by the operating lever 21 to transmit the rotation of the operating lever 21 to the output shaft member 30. The output-side clutch 60 prevents the rotation of the output shaft member 30 even when the vertical force is applied to the sitting seat 40a. The input-side clutch 50 and the output-side clutch 60 are housed in the housing 11.

The output shaft member 30 is a shaft member which extends in a right and left direction of FIG. 3. In the following description, "the axial direction" indicates an extending direction of the output shaft member 30. As illustrated in FIG. 3, the output shaft member 30 passes through the output-side clutch 60 and the input-side clutch 50 in order from a left side to a right side in FIG. 3. In the following description, the left side in FIG. 3 is referred to as an axial output side, and the right side in FIG. 3 is referred to as an axial input side. The pinion gear 31 is provided in the end portion of the output shaft member 30 on the axial output side.

In the output shaft member 30, the pinion gear 31, a large diameter cylindrical part 32, a spline part 33, and a small diameter cylindrical part 34 are provided in order from the output side to the axial input side.

The large diameter cylindrical part 32 is rotatably supported in a metal bush 13 fixed in an output-side outer-ring member 62 of the output-side clutch 60 (to be described). The small diameter cylindrical part 34 is rotatably supported in an input-side inner-ring member 51 and an input-side outer-ring member 52 of the input-side clutch 50 (to be described), and the housing 11. A plurality of groove parts are formed in the outer circumferential surface of the spline part 33. The spline part 33 is spline-coupled with an output-side inner-ring member 61 of the output-side clutch 60 (to be described).

A stopper ring 36 is mounted in the small diameter cylindrical part 34 of the output shaft member 30. The stopper ring 36 includes a cylindrical fitting part 36a and a disc-shaped flange part 36b which is positioned on the axial output side from the fitting part 36a. The small diameter cylindrical part 34 of the output shaft member 30 is fitted in the fitting part 36a. The flange part 36b abuts on the operating plate 22 (to be described) to prevent that the operating plate 22, the housing 11, the input-side clutch 50, or the output-side clutch 60 falls out of the output shaft member 30.

The housing 11 is a cup-shaped member, and includes a bottom surface 11a and a cylindrical part 11b. Two fixation flanges 11c protruding radially is formed in the end portion of the cylindrical part 11b on the axial output side from the bottom surface 11a. A fixation-bolt insertion hole 11d is provided in the fixation flange 11c. A bolt (not illustrated) inserted into the fixation-bolt insertion hole 11d is screwed into a screw hole of the seat frame 40c, so that the housing 11 is fixed in the seat frame 40c. Otherwise, the housing 11 may be fixed in the seat frame 40c in such a manner that a caulking part is provided in the housing 11, and the caulking part is caulked in the seat frame 40c.

A spring lock part 24 having a spring lock piece 24a is fixed in one fixation flange 11c. The spring lock part 24 is fixed in the fixation flange 11c of the housing 11.

The spring lock piece 24a extends along the cylindrical part 11b in the axial direction.

A cylindrical bearing 11g is formed in a radially central part of the bottom surface 11a by a burring process. The bearing 11g extends from the bottom surface 11a toward the axial input side. Three window parts 11h made by arc-shaped long holes and three protrusion pieces 11i extending from the edge parts of the window parts 11h toward the axial output side are formed in the bottom surface 11a.

The operating lever 21 is made of synthetic resin, for example, and includes a fixation part 21a in which the operating plate 22 is fixed, and a rod-shaped grip part 21b extending from the fixation part 21a to the radial outside. The operating lever 21 is fixed in the operating plate 22.

The operating plate 22 is positively and reversely rotated integrally with the operating lever 21 when the operator grips the grip part 21b of the operating lever 21 and operates the operating lever 21 to be rotated positively and reversely. The operating plate 22 is provided between the housing 11 and the operating lever 21 in the axial direction. The operating plate 22 is fixed in the operating lever 21. The operating plate 22 is rotatably supported in the housing 11.

The operating plate 22 includes an insertion hole 22a in the radially central portion. The small diameter cylindrical part 34 of the output shaft member 30 is inserted into the insertion hole 22a. The operating plate 22 includes three rectangular engagement holes 22b and a circular fixation hole 22c near the insertion hole 22a. The operating plate 22 is fixed in the operating lever 21 when a screw (not illustrated) inserted into the fixation hole 22c is screwed in the operating lever 21.

A pair of regulation piece parts 22e and an operation piece part 22d are provided in the outer circumferential edge of the operating plate 22. The operation piece part 22d is provided between the pair of regulation piece parts 22e. The pair of regulation piece parts 22e and the operation piece part 22d extend toward the axial output side.

A return spring 23 is provided in the outer circumference of the housing 11. The return spring 23 is a spring which makes the operating lever 21 (and the operating plate 22) return to the neutral position when the operational force is not applied to the operating lever 21 (when the operational force is opened). The return spring 23 is an arc-shaped plate spring which brings both free end parts 23a close to each other. The spring lock piece 24a of the spring lock part 24 fixed in the housing 11 and the operation piece part 22d of the operating plate 22 are arranged between both free end parts 23a of the return spring 23.

Figure 4A:
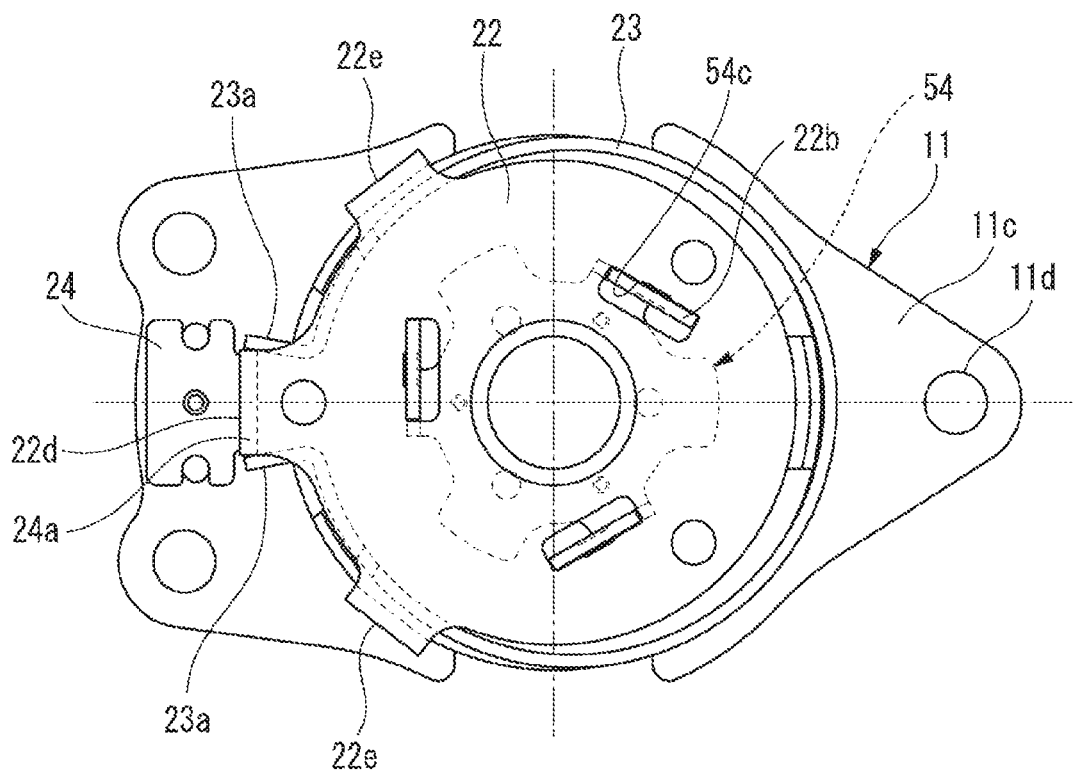
FIGS. 4A and 4B are views illustrating a movement of an operating plate, and are views as seen from a direction of arrow A in FIG. 3.
Figure 4B:
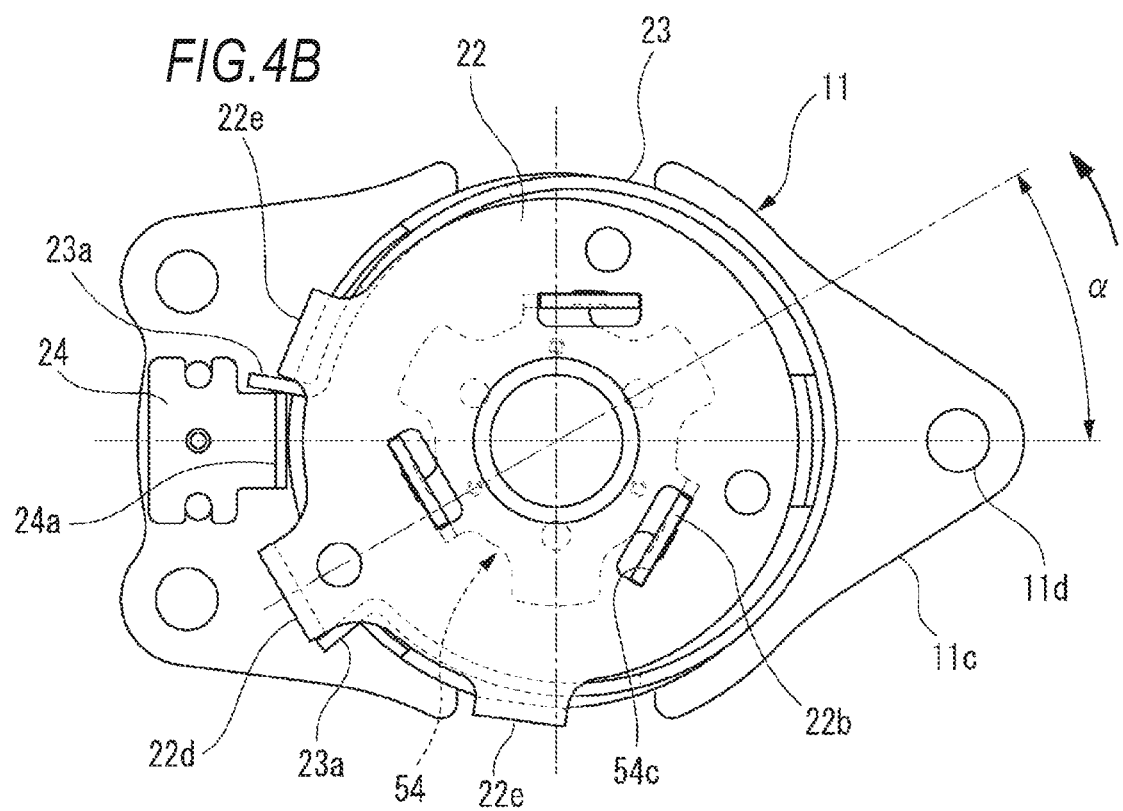

FIG. 4 is views illustrating a movement of the operating plate 22. FIG. 4 is views as seen from a direction of an arrow A in FIG. 3. FIG. 4A illustrates the neutral state, and FIG. 4B illustrates the driven state.

As illustrated in FIG. 4A, in a state where the operator does not apply the operational force to the operating lever 21 (neutral state), the operating lever 21 is supported to the neutral position in which the pair of free end parts 23a of the return spring 23 abut on the spring lock piece 24a and the operation piece part 22d together.

As illustrated in FIG. 4B, when the operator operates the operating lever 21 to be rotated to any one of a positive side and a reverse side and to be in a driven state, the operating plate 22 is rotated with respect to the housing 11 together with the operating lever 21. Then, one free end part 23a of the pair of free end parts 23a is maintained to be in an engagement state with the spring lock piece 24a fixed in the housing 11. The other free end part 23a is engaged with the operation piece part 22d of the operating plate 22 and moves in a direction away from the one free end part 23a. Therefore, the return spring 23 is bent to apply the force of returning to the neutral position.

When the rotating amount of the operating lever 21 reaches the predetermined amount, the regulation piece part 22e of the operating plate 22 abuts on the other free end part 23a abutting on the spring lock piece 24a, so as to regulate further rotation of the operating lever 21.

<Input-Side Clutch>

Returning to FIGS. 2 and 3, the input-side clutch 50 includes the input-side inner-ring member 51, the input-side outer-ring member 52, an operation bracket 54, an input-side clutch roller (input-side transmission member) 55, and an input-side roller biasing spring 56.

The input-side inner-ring member 51 is a columnar member extending in the axial direction. The input-side inner-ring member 51 includes, in the center, an insertion hole 51a into which the small diameter cylindrical part 34 of the output shaft member 30 is inserted. Three protrusion parts 51b are formed in the surface of the input-side inner-ring member 51 on the axial input side (see FIG. 2). Wedge cam parts 51c inflating outward are provided to have constant intervals in three places of the outer circumferential edge of the input-side inner-ring member 51. The operation bracket 54 is fixed in the surface of the input-side inner-ring member 51 on the axial input side.

The operation bracket 54 is a plate-shaped member. The operation bracket 54 includes, in a radial center, an insertion hole 54a into which the small diameter cylindrical part 34 of the output shaft member 30 is inserted. The operation bracket 54 includes three fitting holes 54b into which the protrusion parts 51b of the input-side inner-ring member 51 are fitted.

Three claw parts 54c are provided in the outer circumferential edge of the operation bracket 54. The claw parts 54c pass through the window parts 11h formed in the bottom surface 11a of the housing 11, and are fitted in the engagement holes 22b of the operating plate 22. Accordingly, the input-side inner-ring member 51 is fixed in the operating plate 22 through the operation bracket 54.

The input-side outer-ring member 52 includes a bottom part 52b, an outer ring part 52c, and a fixation part 52d. The bottom part 52b is a disc-shaped portion. An insertion hole 52a into which the small diameter cylindrical part 34 of the output shaft member 30 is inserted is provided in the radial center of the bottom part 52b. The outer ring part 52c is a cylindrical portion formed in the outer edge portion of the bottom part 52b. The bottom part 52b is provided in the end portion of the outer ring part 52c on the axial output side. The fixation part 52d protrudes from the outer edge of the insertion hole 52a to the axial output side. A spline groove is formed in the outer circumferential surface of the fixation part 52d. The fixation part 52d is spline-coupled with a release bracket 64 of the output-side clutch 60 (to be described).

Figure 5A:
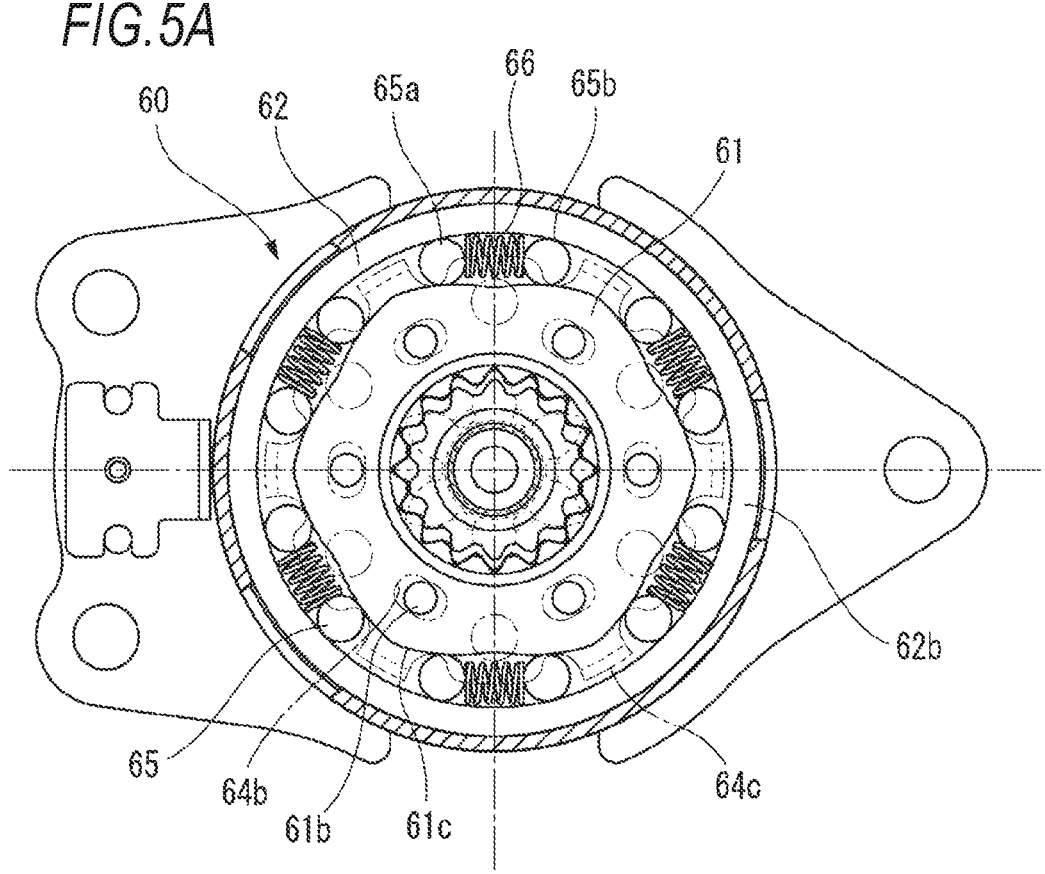
Figure 5B:
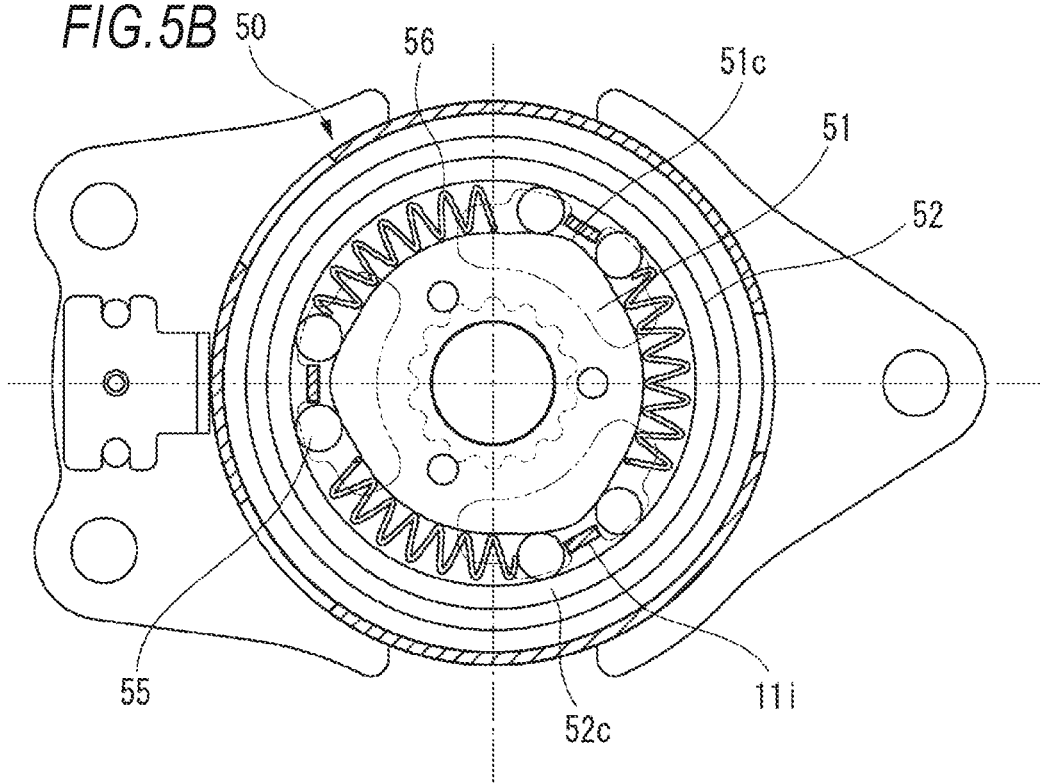

FIG. 5 is views illustrating the vehicle clutch unit 100 in the neutral state illustrated in FIG. 4A. FIG. 5A is a cross-sectional view taken along line B-B in FIG. 3, and illustrates the output-side clutch 60 in the neutral state. FIG. 5B is a cross-sectional view taken along line C-C in FIG. 3, and illustrates the input-side clutch 50 in the neutral state.

As illustrated in FIG. 5B, a gap is provided between the inner circumferential surface of the input-side outer-ring member 52 and the outer circumferential surface of the input-side inner-ring member 51. The inner circumferential surface of the input-side outer-ring member 52 is a circumferential surface, and three wedge cam parts 51c inflating outward are provided in the outer circumferential surface of the input-side inner-ring member 51. For this reason, three portions in which both radially ends are tapered in a wedge shape are formed in a gap between the inner circumferential surface of the input-side outer-ring member 52 and the outer circumferential surface of the input-side inner-ring member 51. The three protrusion pieces 11i of the housing protrude to the gap. When the input-side inner-ring member 51 is rotated by the operating lever 21, the protrusion piece 11i regulates the movement of the input-side clutch roller 55.

The input-side clutch 50 includes six input-side clutch rollers 55, and three input-side roller biasing springs 56. The input-side clutch roller 55 and the input-side roller biasing spring 56 are arranged between the outer circumferential surface of the input-side inner-ring member 51 and the inner circumferential surface of the outer ring part 52c of the input-side outer-ring member 52.

The input-side roller biasing spring 56 is arranged among the wedge cam parts 51c of the input-side inner-ring member 51 in the radial direction. Further, the pair of input-side clutch rollers 55 are arranged in each of both sides of the wedge cam part 51c of the input-side inner-ring member 51. The protrusion piece 11i of the housing 11 is arranged between the pair of input-side clutch rollers 55.

<Output-Side Clutch>

Returning to FIGS. 2 and 3, the output-side clutch 60 includes the output-side inner-ring member 61, the output-side outer-ring member 62, the release bracket (rotation transmitting part) 64, an output-side clutch roller (output-side transmission member) 65, and an output-side roller biasing spring (elastic member) 66.

The output-side outer-ring member 62 is an almost cylindrical member. The inner circumferential surface of the inner hole of the output-side outer-ring member 62 rotatably supports the large diameter cylindrical part 32 of the output shaft member 30 through a cylindrical part 13b of the metal bush 13. The flange part 13a of the metal bush 13 slidingly contacts the output-side inner-ring member 61, so as to prevent that the output-side inner-ring member 61 falls out of the output shaft member 30. The cylindrical part 13b of the metal bush 13 is made of resin. The metal bush 13 applies a frictional force to the output shaft member 30 to suppress a rotational speed of the output shaft member 30 at the time of lowering the vehicle seat 40.

The output-side outer-ring member 62 includes a disc-shaped bottom part 62a, a cylindrical first cylindrical part 62b which extends from the bottom part 62a to the axial input side, and a second cylindrical part 62c which extends from the bottom part 62a to the axial output side. The second cylindrical part 62c has a diameter smaller than the first cylindrical part 62b.

A taper part 62d is provided in each of two places of the outer circumferential edge of the output-side outer-ring member 62. The caulking part 11f provided with the housing 11 is bent to the radial inside to be caulked in the outer circumferential edge of the output-side outer-ring member 62, so that the output-side outer-ring member 62 is fixed in the housing 11 in an unrotatable manner.

The output-side inner-ring member 61 is an almost cylindrical member. The output-side inner-ring member 61 is a member having a diameter smaller than that of the first cylindrical part 62b of the output-side outer-ring member 62. A plurality of groove parts are provided in the inner circumferential surface of the inner hole of the output-side inner-ring member 61, and serve as a spline part 61a to be coupled with the spline part 33 of the output shaft member 30. Six protrusion parts 61b are formed in the surface of the output-side inner-ring member 61 on the axial input side (see FIG. 3). Six wedge cam parts 61c inflating outward are formed to have constant intervals in the outer circumferential portion of the output-side inner-ring member 61.

The release bracket 64 is a plate-shaped member. A first engagement hole 64a having the plurality of groove parts is formed in the inner circumferential surface of the release bracket 64. The first engagement hole 64a is spline-coupled with the fixation part 52d of the input-side outer-ring member 52. Accordingly, the release bracket 64 can be rotated together with the input-side outer-ring member 52.

The release bracket 64 includes a plurality of second engagement holes 64b into which the protrusion parts 61b of the output-side inner-ring member 61 are inserted. The second engagement hole 64b is a long hole extending in a circumferential direction. The protrusion part 61b can be displaced slightly in a circumferential direction in the second engagement hole 64b. In other words, the release bracket 64 and the output-side inner-ring member 61 are relatively rotated within a range in which the protrusion part 61b is displaced within the second engagement hole 64b. Six protrusion pieces 64c are provided in the outer circumferential edge of the release bracket 64.

As illustrated in FIG. 5A, a gap is provided between the inner circumferential surface of the output-side outer-ring member 62 and the outer circumferential surface of the output-side inner-ring member 61. The inner circumferential surface of the output-side outer-ring member 62 is a circumferential surface, and the six wedge cam parts 61c inflating outward are provided in the outer circumferential surface of the output-side inner-ring member 61. For this reason, six portions in which both radially ends are tapered in a wedge shape are formed in a gap between the inner circumferential surface of the output-side outer-ring member 62 and the outer circumferential surface of the output-side inner-ring member 61. The six protrusion pieces 64c of the release bracket 64 protrude in the gap. When the release bracket 64 is rotated, the protrusion piece 64c moves within the gap.

The output-side clutch 60 includes twelve output-side clutch rollers 65 and six output-side roller biasing springs 66. The output-side clutch roller 65 and the output-side roller biasing spring 66 are arranged in a gap between the outer circumferential surface of the output-side inner-ring member 61 and the inner circumferential surface of the first cylindrical part 62b of the output-side outer-ring member 62.

The output-side roller biasing spring 66 is arranged among the wedge cam parts 61c of the output-side inner-ring member 61 in the radial direction. Further, the pair of the output-side clutch rollers 65 are arranged in each of both sides of the wedge cam part 61c of the output-side inner-ring member 61. The protrusion piece 64c of the release bracket 64 is arranged between the pair of output-side clutch rollers 65. The output-side clutch roller 65 is biased by the output-side roller biasing spring 66 toward the top portion of the wedge cam part 61c.

Next, the description will be given about the operation of the vehicle clutch unit 100 configured as above. Incidentally, the description has been given above about a case where the operating lever 21 is rotated counterclockwise. A case where the operating lever 21 is rotated clockwise is the same as the description given above except that the rotational direction is reverse, and thus will not be described.

<Rotation Operation of Operating Lever>

As illustrated in FIG. 4A, in the vehicle clutch unit 100, in the neutral state, the pair of free end parts 23a of the return spring 23 abut on the spring lock piece 24a and the operation piece part 22d.

As illustrated in FIG. 4B, when the operating lever 21 is counterclockwise rotated by the rotation angel α from the neutral position, one free end part 23a of the pair of free end parts 23a is maintained to be in an engagement state with the spring lock piece 24a, and the other free end part 23a is engaged in the operation piece part 22d of the operating plate 22 and moves in the direction away from the one free end part 23a.

Further, when the regulation piece part 22e of the operating plate 22 abuts on the other free end part 23a abutting on the spring lock piece 24a, the rotation of the operating lever 21 is regulated. The state where the rotation of the operating lever 21 is regulated is set as a maximum operation state of the operating lever 21. In other words, the operating lever 21 is rotated within such a range that the rotation angel from the neutral state to the maximum operation state is a maximum operation angle αmax. Further, when the operating lever 21 is rotated, the return spring 23 is bent to apply a returning force of returning to the neutral position.

Next, the description will be given about the operation from the neutral state to the maximum operation state.

<Neutral State>

FIG. 5A illustrates the output-side clutch 60 in the neutral state. As illustrated in FIG. 5A, in the neutral state, in the output-side clutch 60, the output-side clutch roller 65 is biased by the output-side roller biasing spring 66 toward the top portion of the wedge cam part 61c. Accordingly, the output-side clutch roller 65 is bitten into a wedge-shaped gap between the wedge cam part 61c and the inner circumferential surface of the first cylindrical part 62b.

More specifically, a gap where a first output-side clutch roller 65a is positioned is tapered counterclockwise in a wedge shape. The first output-side clutch roller 65a is biased counterclockwise by the output-side roller biasing spring 66. For this reason, the first output-side clutch roller 65a is bitten counterclockwise into between the output-side inner-ring member 61 and the output-side outer-ring member 62.

A gap where a second output-side clutch roller 65b is positioned is tapered clockwise in a wedge shape. The second output-side clutch roller 65b is biased clockwise by the output-side roller biasing spring 66. For this reason, the second output-side clutch roller 65b is bitten clockwise into between the output-side inner-ring member 61 and the output-side outer-ring member 62.

The output-side outer-ring member 62 is unmovable with respect to the housing 11, and the first output-side clutch roller 65a and the second output-side clutch roller 65b are bitten counterclockwise and clockwise into both of the output-side inner-ring member 61 and the output-side outer-ring member 62, whereby the output-side inner-ring member 61 and the output-side outer-ring member 62 cannot be rotated. As a result, the output shaft member 30 which is spline-coupled with the output-side inner-ring member 61 cannot be rotated.

As described above, in the neutral state, the output-side inner-ring member 61 and the output-side outer-ring member 62 become in a lock state where the rotation cannot be performed, and thus the output shaft member 30 is not rotated even when the rotational force is applied from the vehicle seat 40 side to the output shaft member 30. Accordingly, the vehicle seat 40 is fixed in a state where the height thereof is maintained.

FIG. 5A illustrates the input-side clutch 50 in the neutral state. As illustrated in FIG. 5B, in the neutral state, in the input-side clutch 50, the input-side clutch roller 55 does not contact the input-side roller biasing spring 56, and the input-side clutch roller 55 is not biased toward the top portion of the wedge cam part 51c by the input-side roller biasing spring 56. For this reason, in the neutral state, the input-side clutch roller 55 is bitten into between the input-side inner-ring member 51 and the input-side outer-ring member 52. Accordingly, when the operating lever 21 is rotated, the input-side outer-ring member 52 can be rotated together with the input-side inner-ring member 51 through the input-side clutch roller 55.

<Initial Stage of Rotation>

Figure 6A:
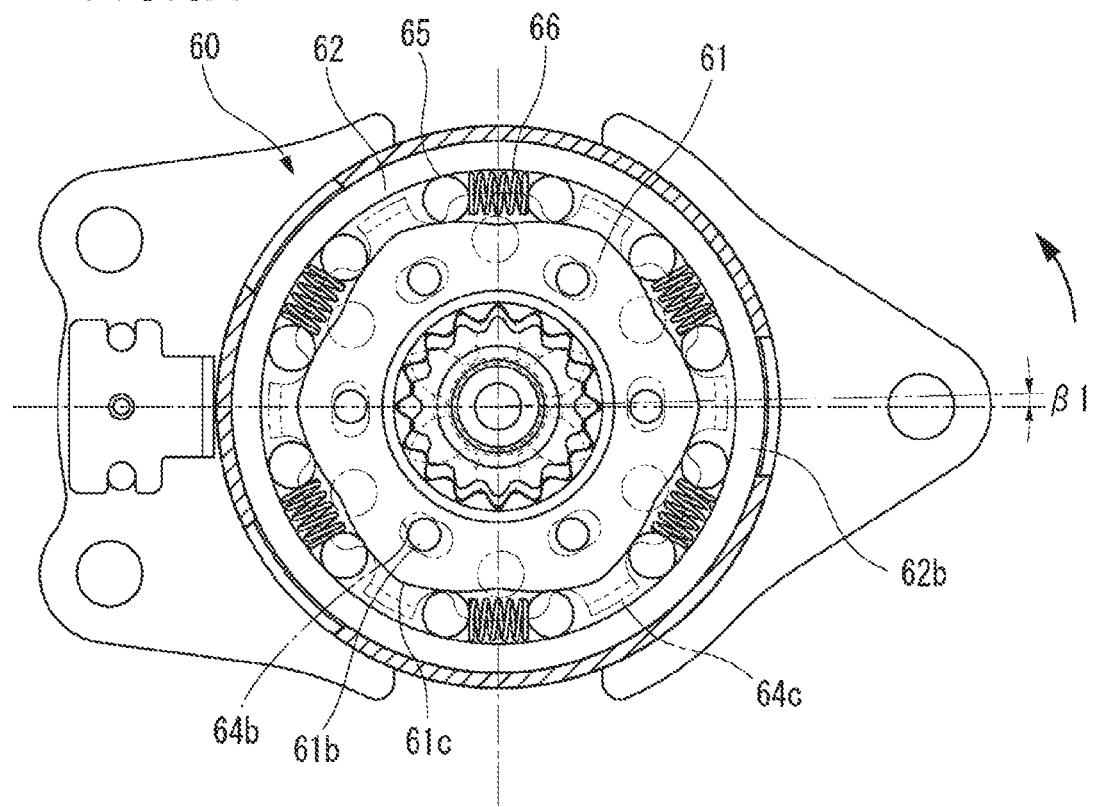
Figure 6B:
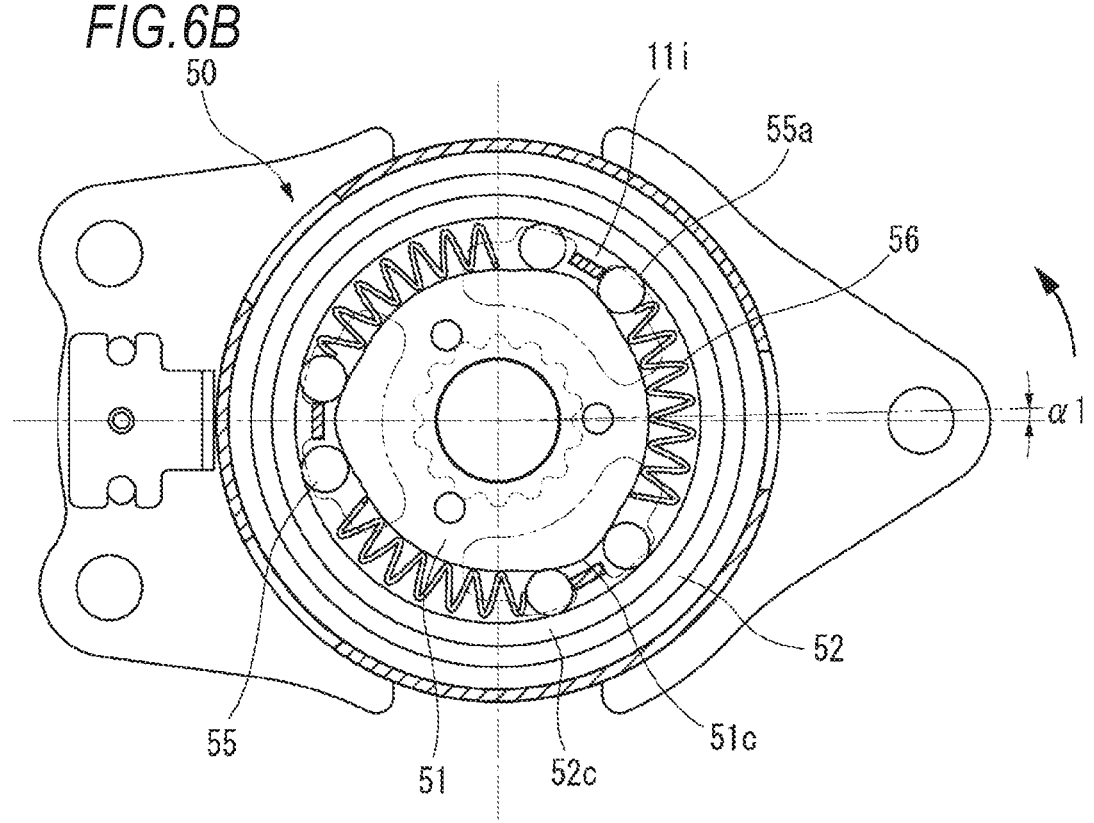

FIGS. 6A and 6B are views illustrating a state where the operating lever 21 is counterclockwise rotated by a minute angle α1 from the neutral position. FIG. 6A illustrates the output-side clutch 60, and FIG. 6B illustrates the input-side clutch 50.

As illustrated in FIG. 6B, when the operating lever 21 is counterclockwise rotated by the angle α1 from the neutral position, the rotation is transmitted to the input-side inner-ring member 51 through the operating plate 22 and the operation bracket 54. Then, the input-side inner-ring member 51 is rotated together with the operating lever 21 by the angle α1, and the input-side outer-ring member 52 is rotated together with the input-side inner-ring member 51 through the input-side clutch roller 55.

The input-side outer-ring member 52 of the input-side clutch 50 is spline-coupled with the release bracket 64. For this reason, as illustrated in FIG. 6A, when the input-side outer-ring member 52 is rotated, the release bracket 64 is rotated together with the input-side outer-ring member 52 by the angle β1.

Incidentally, in the state illustrated in FIG. 6A, the inner circumferential surface of the second engagement hole 64b of the release bracket 64 does not abut on the protrusion part 61b of the output-side inner-ring member 61. For this reason, the rotation is not transmitted from the input-side outer-ring member 52 to the output-side inner-ring member 61 or the output-side outer-ring member 62, so that the output-side inner-ring member 61 or the output-side outer-ring member 62 is not rotated.

<Output-Side Lock Release>

FIG. 7 is views illustrating a state where the operating lever 21 is rotated further counterclockwise from the state of FIGS. 6A and 6B. FIG. 7A illustrates the output-side clutch 60, and FIG. 7B illustrates the input-side clutch 50.

As illustrated in FIG. 7B, when the operating lever 21 is rotated further counterclockwise, the input-side inner-ring member 51 and the input-side outer-ring member 52 are rotated such that the rotation angel of the input-side inner-ring member 51 and the input-side outer-ring member 52 is α2 (α2>α1).

Then, as illustrated in FIG. 7A, the release bracket 64 which is rotated together with the input-side outer-ring member 52 is rotated until an angle β2. When the rotation angel of the release bracket 64 reaches β2 (output-side lock release angle), the protrusion piece 64c of the release bracket 64 abuts on the output-side clutch roller 65c counterclockwise adjacent to the protrusion piece 64c, and the output-side clutch roller 65c is pressed in a counterclockwise rotational direction. Then, the biting into between the wedge cam part 61c of the output-side clutch roller 65c and the inner circumferential surface of the first cylindrical part 62b is released. Accordingly, the output-side outer-ring member 62 and the output-side inner-ring member 61 become in a state where a counterclockwise rotation can be performed.

<Rotational-Force Transmission State>

Figure 8A:
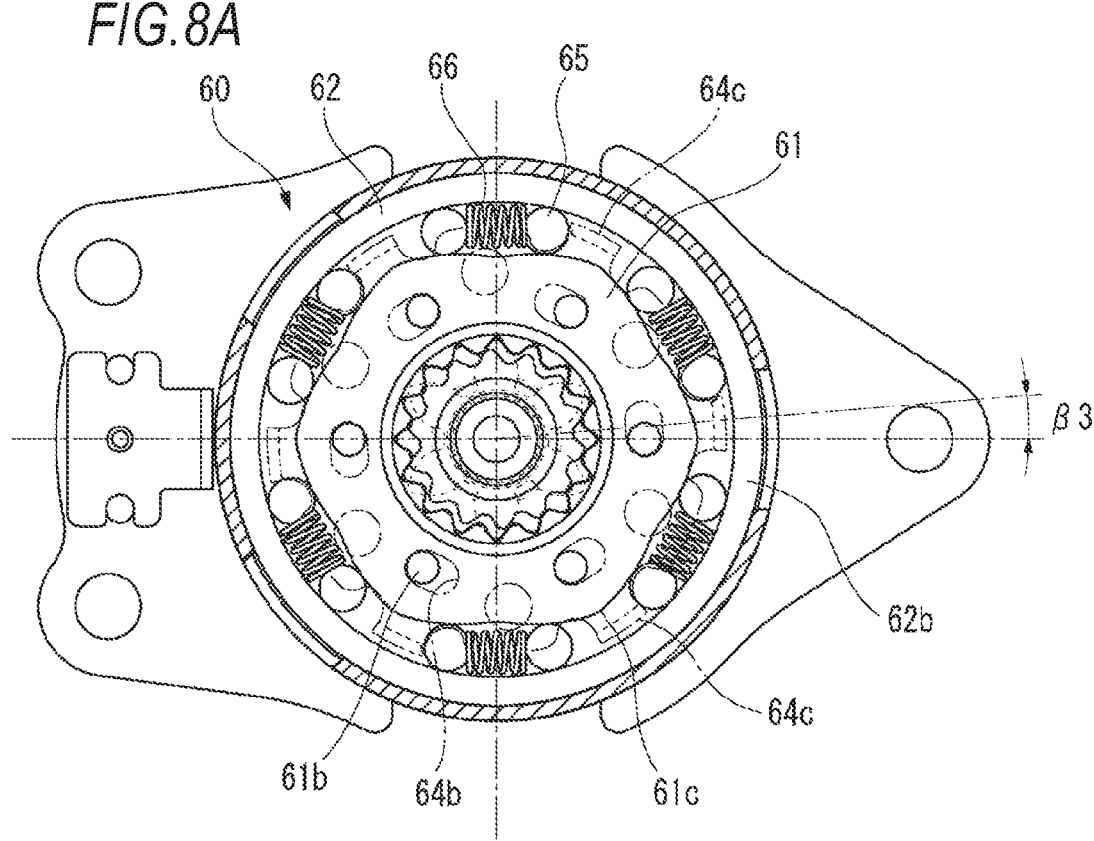
Figure 8B:
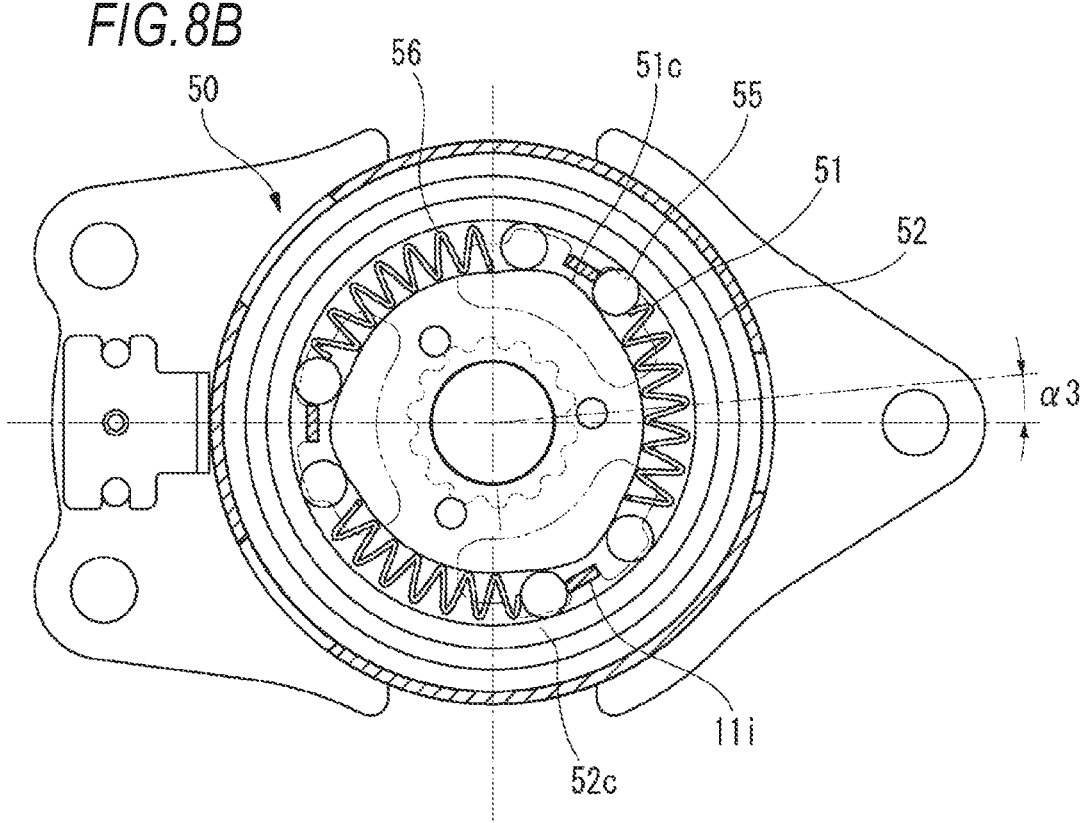

FIG. 8 is views illustrating a state where the operating lever 21 is rotated further counterclockwise from the state of FIGS. 7A and 7B. FIG. 8A illustrates the output-side clutch 60, and FIG. 8B illustrates the input-side clutch 50.

As illustrated in FIG. 8B, when the operating lever 21 is rotated further counterclockwise, the input-side inner-ring member 51 and the input-side outer-ring member 52 are rotated such that the rotation angel of the input-side inner-ring member 51 and the input-side outer-ring member 52 is α3 (α3>α2).

Then, as illustrated in FIG. 8B, the release bracket 64 is counterclockwise rotated until the angle β3 (β3>β2). Further, when the rotation angel of the release bracket 64 reaches β3, the inner circumferential surface of the second engagement hole 64b of the release bracket 64 abuts on the protrusion part 61b of the output-side inner-ring member 61. Accordingly, the rotation of the release bracket 64 can be transmitted to the output-side inner-ring member 61. In addition, as illustrated in FIGS. 7A and 7B, the output-side inner-ring member 61 and the output-side outer-ring member 62 can be rotated counterclockwise. For this reason, when the operating lever 21 is further rotated counterclockwise from the state of FIGS. 8A and 8B, the output-side inner-ring member 61 and the output-side outer-ring member 62 are rotated counterclockwise, and the output shaft member 30 spline-coupled with the output-side outer-ring member 62 is rotated counterclockwise. Accordingly, the height of the sitting seat 40a of the vehicle seat 40 is displaced.

<Maximum Rotation State>

Figure 9A:
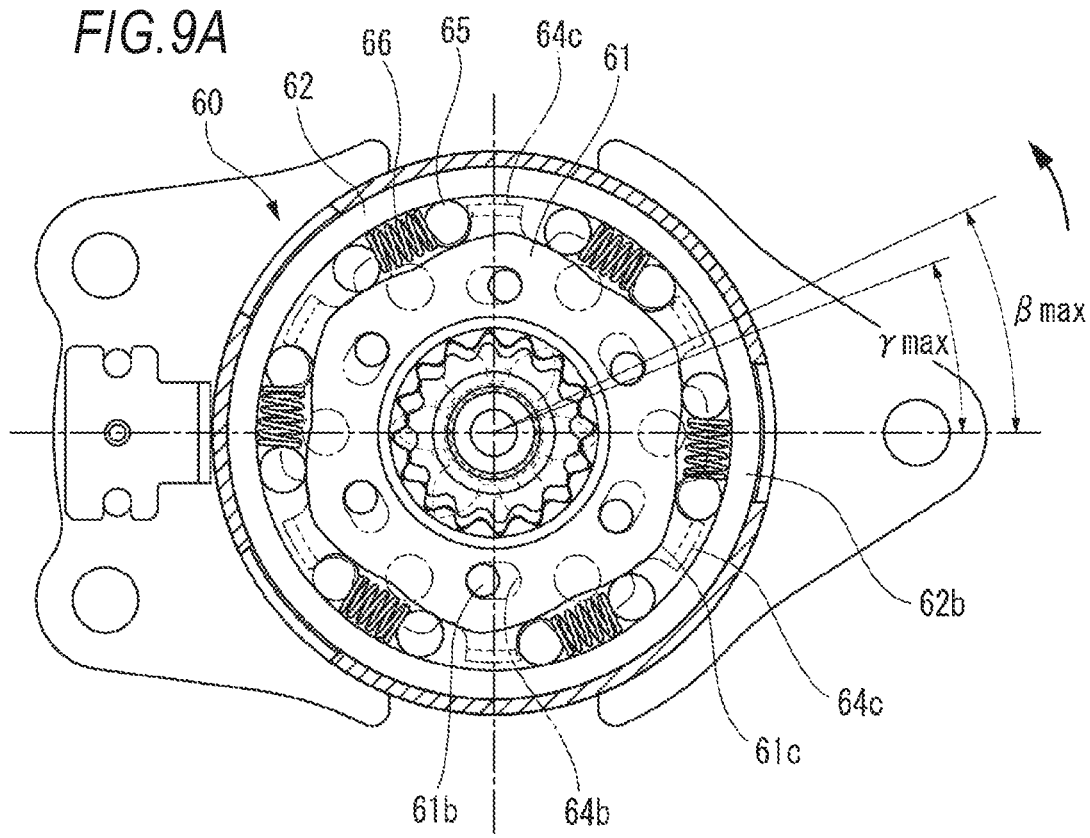
FIGS. 9A and 9B are views illustrating the internal operation of the vehicle clutch unit.
Figure 9B:
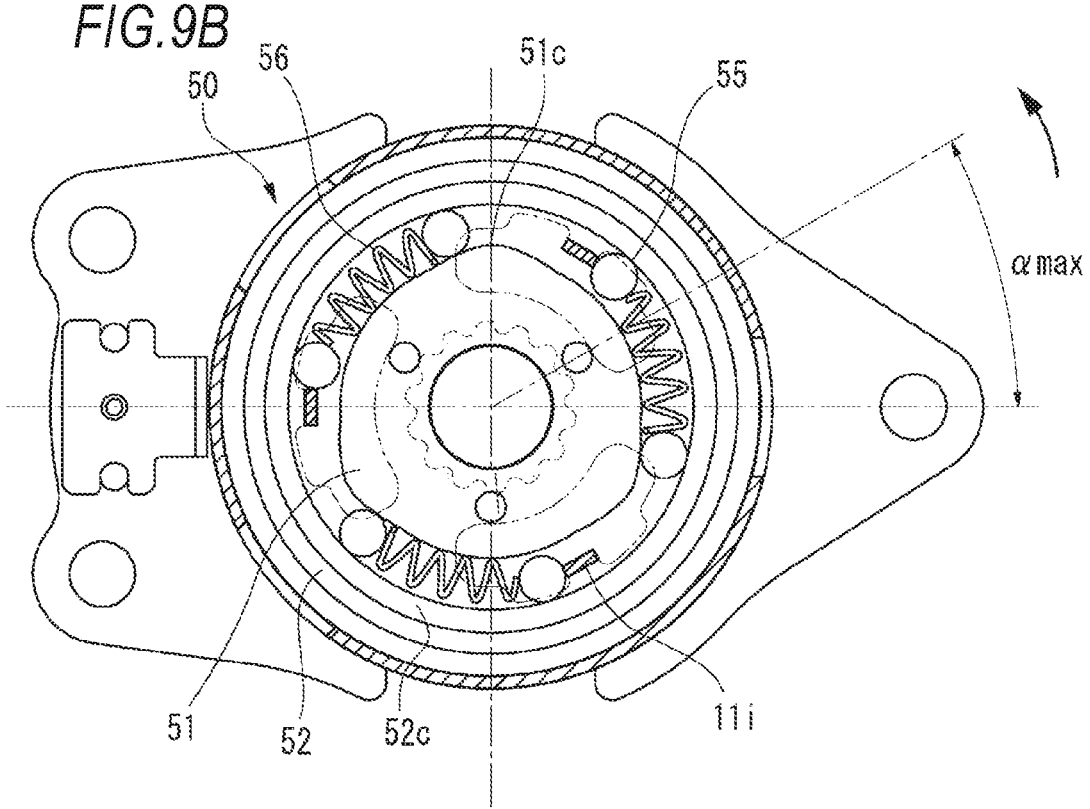

FIG. 9 is views illustrating a state where the operating lever 21 is rotated counterclockwise until the maximum operation angle αmax. FIG. 9A illustrates the output-side clutch 60, and FIG. 9B illustrates the input-side clutch 50.

When the operating lever 21 is rotated to reach the maximum operation angle αmax, the vehicle clutch unit 100 becomes the maximum rotation state. In the state, the regulation piece part 22e of the operating plate 22 abuts on the other free end part 23a abutting on the spring lock piece 24a, so as to regulate the rotation of the operating lever 21 (see FIG. 4B).

In the maximum rotation state, as illustrated in FIG. 9B, the rotation angel α in which the input-side inner-ring member 51 and the input-side outer-ring member 52 are rotated counterclockwise is set as the maximum rotation angel αmax. In addition, as illustrated in FIG. 9A, the rotation angel in which the release bracket 64 is rotated counterclockwise is set as a maximum rotation angel βmax. Further, the rotation angel γ in which the output-side inner-ring member 61 rotated together with the release bracket 64 is rotated counterclockwise is set as a maximum rotation angel γmax.

<Returning to the Neutral State>

When one rotation operation by the operating lever 21 is ended, and the rotational force is released which the operator has applied to the operating lever 21, the operating lever 21 is clockwise rotated toward an initial neutral position by the returning force generated by the bent return spring 23. Then, in the input-side clutch 50, when the operating lever 21 is rotated counterclockwise, the input-side inner-ring member 51 is rotated counterclockwise through the operating plate 22 and the operation bracket 54.

Incidentally, when the rotation angel of the input-side inner-ring member 51 becomes in a state where the rotation angel of the input-side inner-ring member 51 illustrated in FIG. 6B is larger than that of the state of α1 (the state illustrated in FIGS. 7A to 9B), the protrusion piece 11i of the housing 11 abuts on the input-side clutch roller 55a clockwise adjacent to the protrusion piece 11i of the housing 11, so as to press the input-side clutch roller 55a counterclockwise. Accordingly, the biting of the input-side clutch roller 55a into the wedge cam part 51c and the outer ring part 52c is released. When the input-side inner-ring member 51 is rotated clockwise from the state, the input-side clutch roller 55a cannot transmit the clockwise rotation of the input-side inner-ring member 51 to the input-side outer-ring member 52.

For this reason, in the state where the rotation angel of the input-side inner-ring member 51 illustrated in FIG. 6B is larger than the state of α1 (the state illustrated in FIGS. 7A to 9B), the input-side inner-ring member 51 idles with respect to the input-side outer-ring member 52, only the input-side inner-ring member 51 is rotated clockwise, and the input-side outer-ring member 52 is not rotated. Accordingly, when the operating lever 21 returns to the neutral position, only the input-side inner-ring member 51 returns to the neutral position together with the operating lever 21 (see FIG. 5B), and in the output-side clutch 60, the release bracket 64 is not rotated. As a result, the output shaft member 30 becomes in a state where the rotation phase is maintained (see FIG. 9A).

As described above, in the vehicle clutch unit 100, in the input-side clutch 50, when the operating lever 21 is operated to be driven from the neutral position, the input-side inner-ring member 51 is rotated with the rotation of the operating lever 21, and the input-side outer-ring member 52 is rotated via the input-side clutch roller 55. Thus, the rotation of the operating lever 21 is transmitted to the output-side clutch 60. Further, in the returning operation that the operating lever 21 is operated to return to the neutral position, the operating lever 21 returns to the neutral position while holding the rotation position of the output shaft member 30. In addition, the output-side clutch 60 regulates that the output shaft member 30 is rotated by the force input from the vehicle seat 40 side to the output shaft member 30.

In addition, in the vehicle clutch unit 100 according to this embodiment, the rotation of the input-side inner-ring member 51 of the input-side clutch 50 is transmitted to the input-side outer-ring member 52 immediately after the operating lever 21 is rotated, whereby the responsiveness of the output shaft member 30 is improved.

However, the inventor has realized that in the vehicle clutch unit moving as described above, the co-rotation occurs in the input-side outer-ring member 52 due to the rotation of the input-side inner-ring member 51 at the returning operation of the operating lever 21, so as to deteriorate the responsiveness.

<Co-Rotation>

Herein, the co-rotation of the input-side outer-ring member 52 will be described with reference to FIGS. 10 and 11. FIGS. 10 and 11 illustrate a state where the vehicle clutch unit which moves as described above and does not include a rotation suppressing member 70 (to be described) returns to the neutral position. FIG. 10 illustrates a state of beginning to return from the maximum rotation state (FIGS. 9A and 9B), and FIG. 11 illustrates a state where the operating lever 21 returns to the neutral state.

When the counterclockwise rotation operation by the operating lever 21 is ended, and the operating lever 21 returns to the neutral position, as described above, in the input-side clutch 50, the operating lever 21 is rotated clockwise, and the input-side inner-ring member 51 is clockwise rotated via the operating plate 22 and the operation bracket 54. FIG. 10 illustrates a state immediately after the operating lever 21 is opened from the maximum rotation state, and illustrates a state where the input-side inner-ring member 51 has α4 slightly smaller than the maximum rotation angel αmax.

Figure 10A:
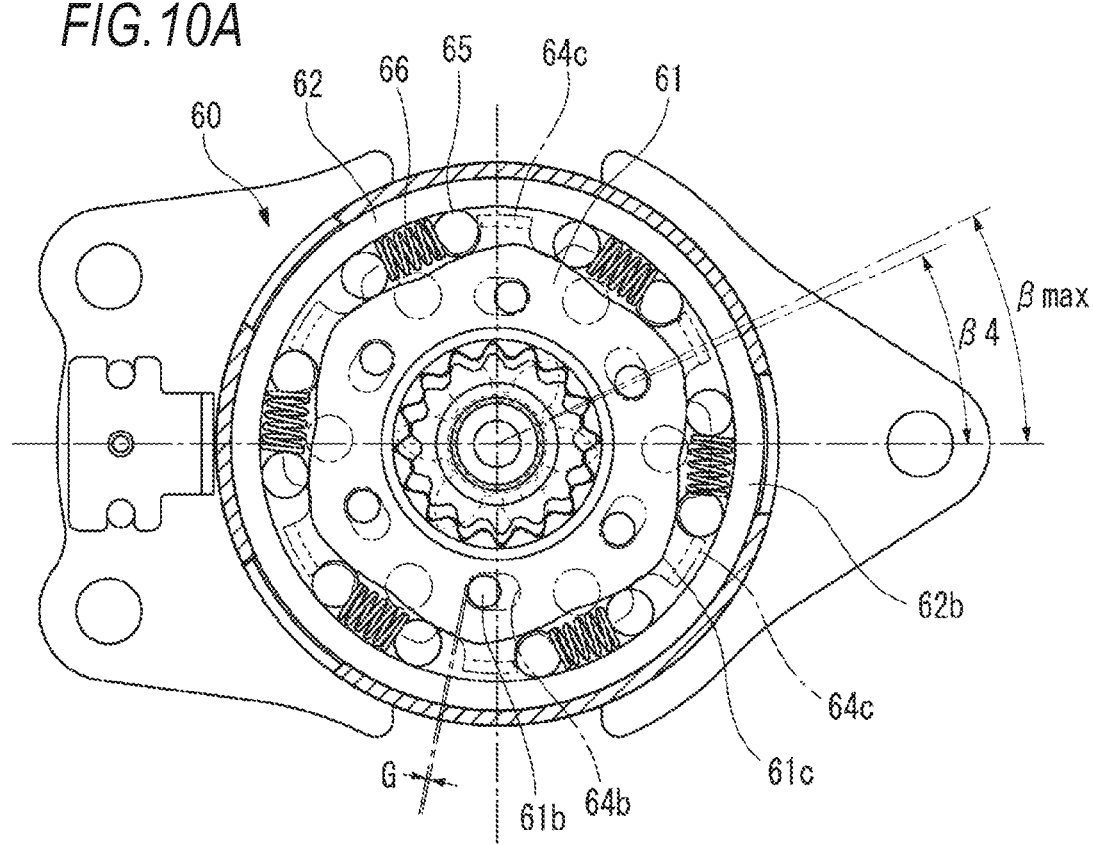
FIGS. 10A and 10B are views illustrating an internal operation of a vehicle clutch unit according to a reference example.
Figure 10B:
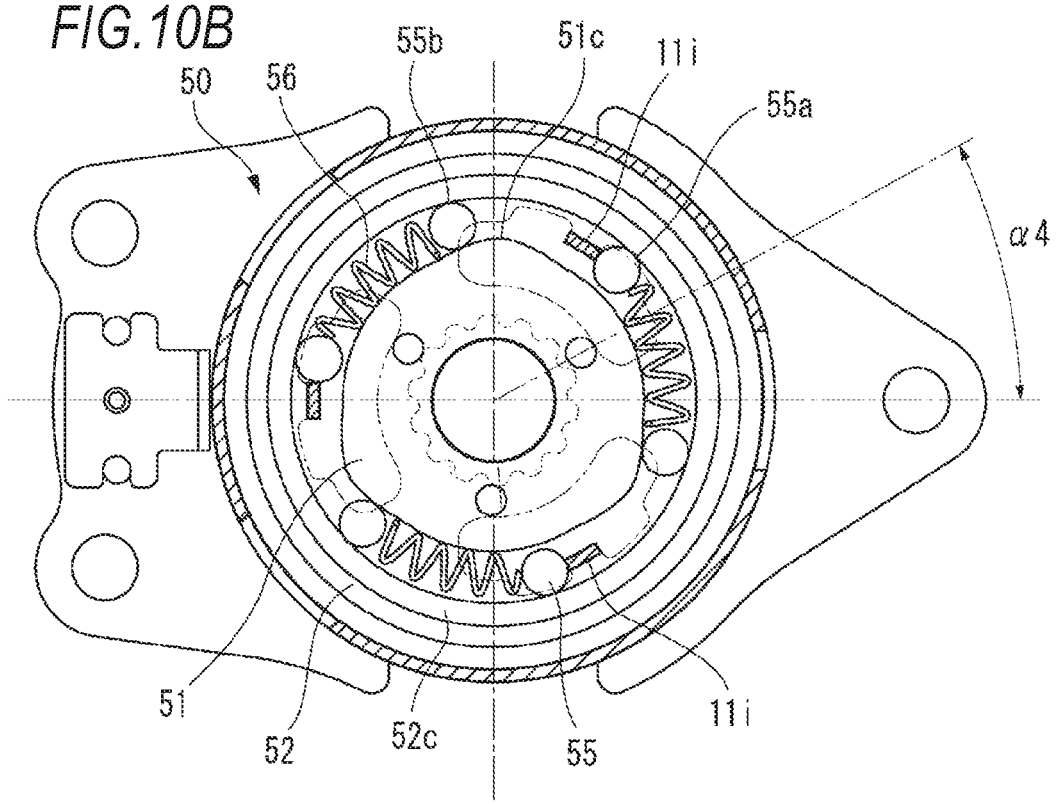

At that time, as illustrated in FIG. 10B, in the input-side clutch 50, the input-side clutch roller 55a counterclockwise positioned from the protrusion piece 11i of the housing 11 is released from the biting of the input-side inner-ring member 51 and the input-side outer-ring member 52. However, the input-side clutch roller 55b clockwise positioned from the protrusion piece 11i of the housing 11 is pressed by the input-side roller biasing spring 56, so as to be in the state of biting into between the input-side inner-ring member 51 and the input-side outer-ring member 52.

As described above, in the state where the input-side clutch roller 55b is pressed by the input-side roller biasing spring 56, the frictional force is applied to between the input-side clutch roller 55b and the input-side inner-ring member 51 and to between the input-side clutch roller 55b and the input-side outer-ring member 52. Until the input-side roller biasing spring 56 returns to a natural length, and the input-side clutch roller 55b is not pressed by the input-side roller biasing spring 56, the frictional force is continuously applied to between the input-side clutch roller 55b and the input-side inner-ring member 51 and to between the input-side clutch roller 55b and the input-side outer-ring member 52.

As a result, while it is originally intended that the input-side outer-ring member 52 is not rotated, and only the input-side inner-ring member 51 is rotated at the time of the returning operation of the operating lever 21, the clockwise rotation of the input-side inner-ring member 51 is transmitted to the input-side outer-ring member 52 through the input-side clutch roller 55b.

Then, the unintentional clockwise rotation of the input-side outer-ring member 52 is transmitted to the spline-coupled release bracket 64. Accordingly, as illustrated in FIG. 10A, the counterclockwise rotation angel β4 of the release bracket 64 becomes an angle slightly smaller than the maximum rotation angel βmax. According to the unintentional rotation of the input-side outer-ring member 52, a state where the inner circumferential surface of the second engagement hole 64b of the release bracket 64 abuts on the protrusion part 61b of the output-side inner-ring member 61 is changed to a state where a minute gap G is formed between the inner circumferential surface of the second engagement hole 64b and the protrusion part 61b.

Figure 11A:
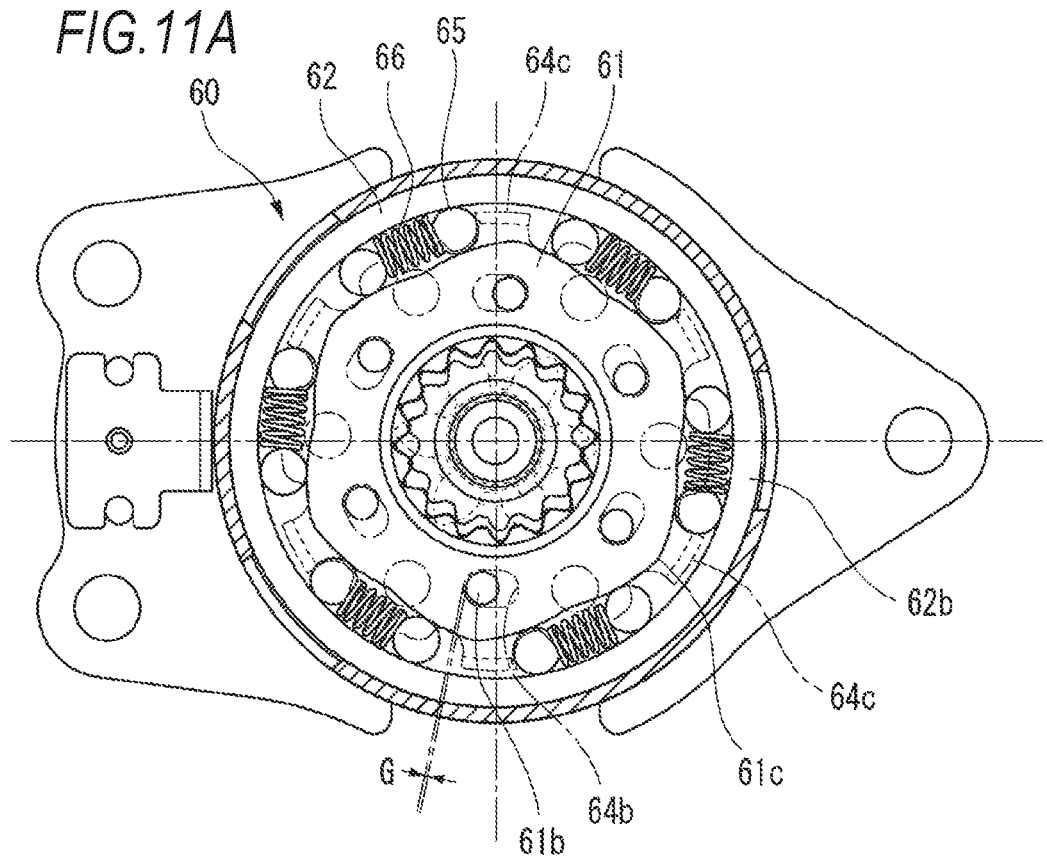
FIGS. 11A and 11B are views illustrating the internal operation of the vehicle clutch unit according to the reference example.
Figure 11B:
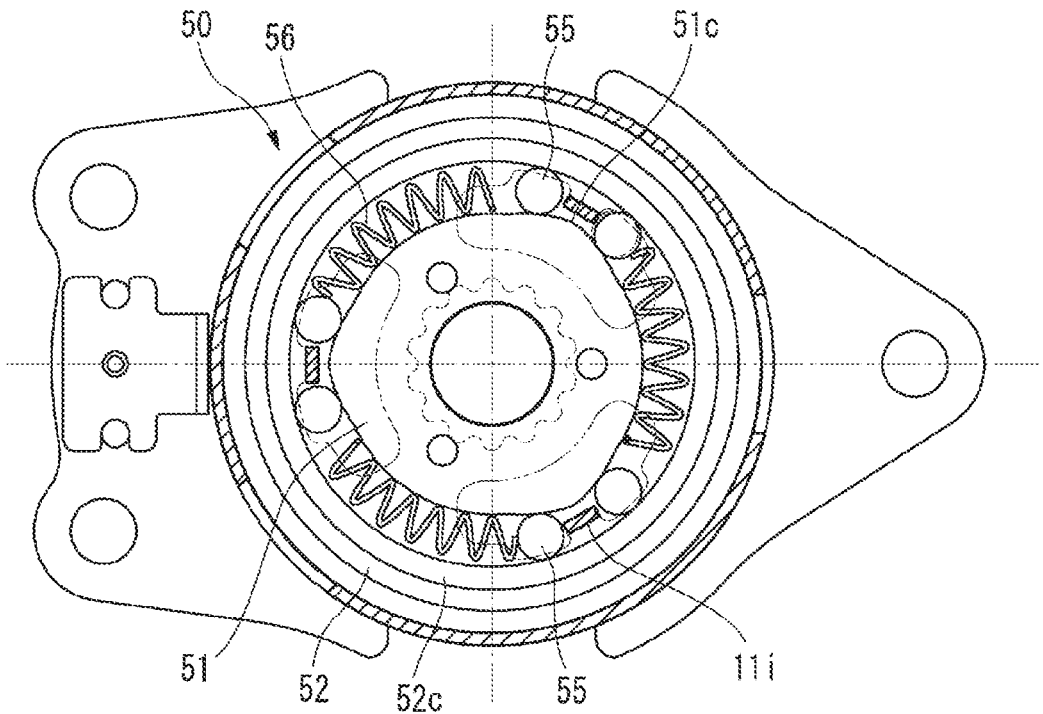

Thereafter, the operating lever 21 returns to the neutral position. Although the input-side inner-ring member 51 returns to the neutral position as illustrated in FIG. 11B, the release bracket 64 is displaced clockwise by the gap G as illustrated in FIG. 11A.

As a result, in a case where the operating lever 21 is counterclockwise rotated from the state in FIG. 11 to counterclockwise rotate the output shaft member 30 again, the timing when the rotation of the release bracket 64 is transmitted to the output-side inner-ring member 61 is delayed by the gap G formed between the inner circumferential surface of the second engagement hole 64b and the protrusion part 61b, so as to deteriorate the responsiveness.

In this regard, in the vehicle clutch unit 100 according to this embodiment, as illustrated in FIGS. 2 and 3, the rotation suppressing member 70 such as a wave washer is provided between the input-side clutch 50 and the output-side clutch 60. The rotation suppressing member 70 is arranged between the input-side outer-ring member 52 of the input-side clutch 50 and the release bracket 64 of the output-side clutch 60 in the axial direction. In the rotation suppressing member 70, a spring steel is formed in a ring shape, and thus a plurality of curved portions are formed in a waveform shape formed alternately along the circumferential direction. The rotation suppressing member 70 biases the input-side outer-ring member 52 and the release bracket 64 in a separating direction from each other.

In other words, in the vehicle clutch unit 100 according to this embodiment, the rotation suppressing member 70 is provided which applies a rotational resistance force larger than the co-rotating force to between the input-side outer-ring member 52 and a member (in this embodiment, the housing 11) which is not rotated at the time of the returning operation of the operating lever 21, so as to suppress that the input-side outer-ring member 52 is co-rotated by the input-side inner-ring member 51 at the time of the returning operation of the operating lever 21. In the vehicle clutch unit 100 according to this embodiment, the input-side outer-ring member 52 is pushed by the rotation suppressing member 70 in the axial direction to generate a force which resists the force which co-rotates the input-side outer-ring member 52. In this embodiment, the rotation suppressing member 70 pushes the input-side outer-ring member 52 to the housing 11 through the input-side inner-ring member 51.

Therefore, in the vehicle clutch unit 100 according to this embodiment, the rotation of the input-side outer-ring member 52 is regulated at the time of the returning operation of the operating lever 21. For this reason, it is suppressed that the input-side outer-ring member 52 is co-rotated by the input-side inner-ring member 51 in a returning direction at the time of the returning operation of the operating lever 21. Accordingly, the responsiveness of the operating lever 21 at the time of the continuous operation is improved.

The rotation suppressing member 70 pushes the input-side clutch 50 (the other member of the input-side outer-ring member 52 and the input-side inner-ring member 51) toward the bottom surface 11a of the housing 11. Thus, an axial rattling of the input-side clutch 50 can be prevented. As described above, the rotation suppressing member 70 also serves to function as a spring for preventing the rattling, and the number of the components is reduced compared to a case where a spring is provided additionally.

Furthermore, the rotation suppressing member 70 pushes the input-side outer-ring member 52 and the release bracket 64 (rotation transmitting part) in a direction of being separated in the axial direction. As described above, by biasing the release bracket 64 in the axial direction, the engaging margin of the release bracket 64 and the output-side inner-ring member 61 can be increased to more reliably release the locking of the output-side clutch 60. In addition, the rotation suppressing member 70 is positioned between the input-side outer-ring member 52 and the release bracket 64, and thus the rotation suppressing member 70 easily presses the input-side outer-ring member 52 and the release bracket 64 (rotation transmitting part) in the direction of being separated in the axial direction.

The output-side clutch 60 includes the output-side inner-ring member 61, the output-side outer-ring member 62, the output-side clutch roller 65 (output-side transmission member), and the output-side roller biasing spring 66 (elastic member). The output-side clutch roller 65 and the output-side roller biasing spring 66 are arranged between the outer circumferential surface of the output-side inner-ring member 61 and the inner circumferential surface of the output-side outer-ring member 62. At the time of the returning operation of the operating lever 21 to the neutral position, the output-side roller biasing spring 66 generates an elastic force which pushes the output-side clutch roller 65 such that the output-side clutch roller 65 moves together with the release bracket 64 (rotation transmitting part). Therefore, at the time of the returning operation of the operating lever 21 to the neutral position, the output-side clutch roller 65 can be pushed without clearance between the wedge cam part 61*c* and the inner circumferential surface of the first cylindrical part 62*b*, so as to lock the output-side inner-ring member 61 in the output-side outer-ring member 62.

According to this embodiment, the vehicle clutch unit 100 includes the bottomed cylindrical housing 11 which accommodates the input-side clutch 50 (the other member of the input-side outer-ring member 52 and the input-side inner-ring member 51). The rotation suppressing member 70 pushes the input-side clutch 50 toward the bottom surface 11*a* of the housing 11. The rotation suppressing member 70 is positioned between the input-side outer-ring member 52 and the release bracket 64.

As described above, the rotation suppressing member 70 is positioned between the input-side outer-ring member 52 (other member) and the release bracket 64 (rotation transmitting part), and thus the rotation suppressing member 70 easily configures a structure that pushes the input-side clutch 50 toward the bottom surface 11*a* of the housing 11, and pushes the release bracket 64 to the output side in the rotational axial direction.

Incidentally, in the above-described embodiment, the wave washer is used exemplarily as the rotation suppressing member 70 in the above description. However, the present invention is not limited thereto. For example, the rotation suppressing member 70 may be a compression spring which applies the rotational resistance force larger than the co-rotating force to between the input-side outer-ring member 52 and the housing 11.

Otherwise, a brake pad attached in the outer circumferential surface of the input-side outer-ring member 52 and a brake pad attached in the inner circumferential surface of the housing 11 may be adopted as the rotation suppressing member 70. A large static frictional force applied to both brake pads suppresses the moving-out of the input-side outer-ring member 52 with respect to the housing 11, and suppresses the co-rotation of the input-side outer-ring member 52.

In the above-described embodiment, the housing 11 is used exemplarily as the member which is not rotated at the time of the returning operation of the operating lever 21 in the above description. However, the present invention is not limited to the housing 11. For example, if a member fixed in the housing 11 or the like is provided as a member which is not rotated at the time of the returning operation of the operating lever 21 separately from the housing 11, the rotation suppressing member 70 can apply a rotational resistance force which is larger than the co-rotating force to between the member and the input-side outer-ring member 52.

In the above-described embodiment, the input-side inner-ring member 51 is configured to be rotated together with the operating lever 21 in the above description. However, the present invention is not limited thereto. For example, a configuration may be adopted which the input-side outer-ring member is rotated together with the operating lever 21. In this case, in order to suppress the co-rotation of the input-side inner-ring member due to the input-side outer-ring member, the rotation suppressing member 70 is configured such that the rotational resistance force larger than the force which co-rotates the input-side inner-ring member is applied to between the input-side inner-ring member and the member which is not rotated at the time of the returning operation of the operating lever 21.

Incidentally, in the above-described embodiment, the rotation suppressing member 70 is exemplarily provided between the input-side outer-ring member 52 of the input-side clutch 50 and the release bracket 64 of the output-side clutch 60 in the above description. However, the present invention is not limited thereto.

Figure 13:
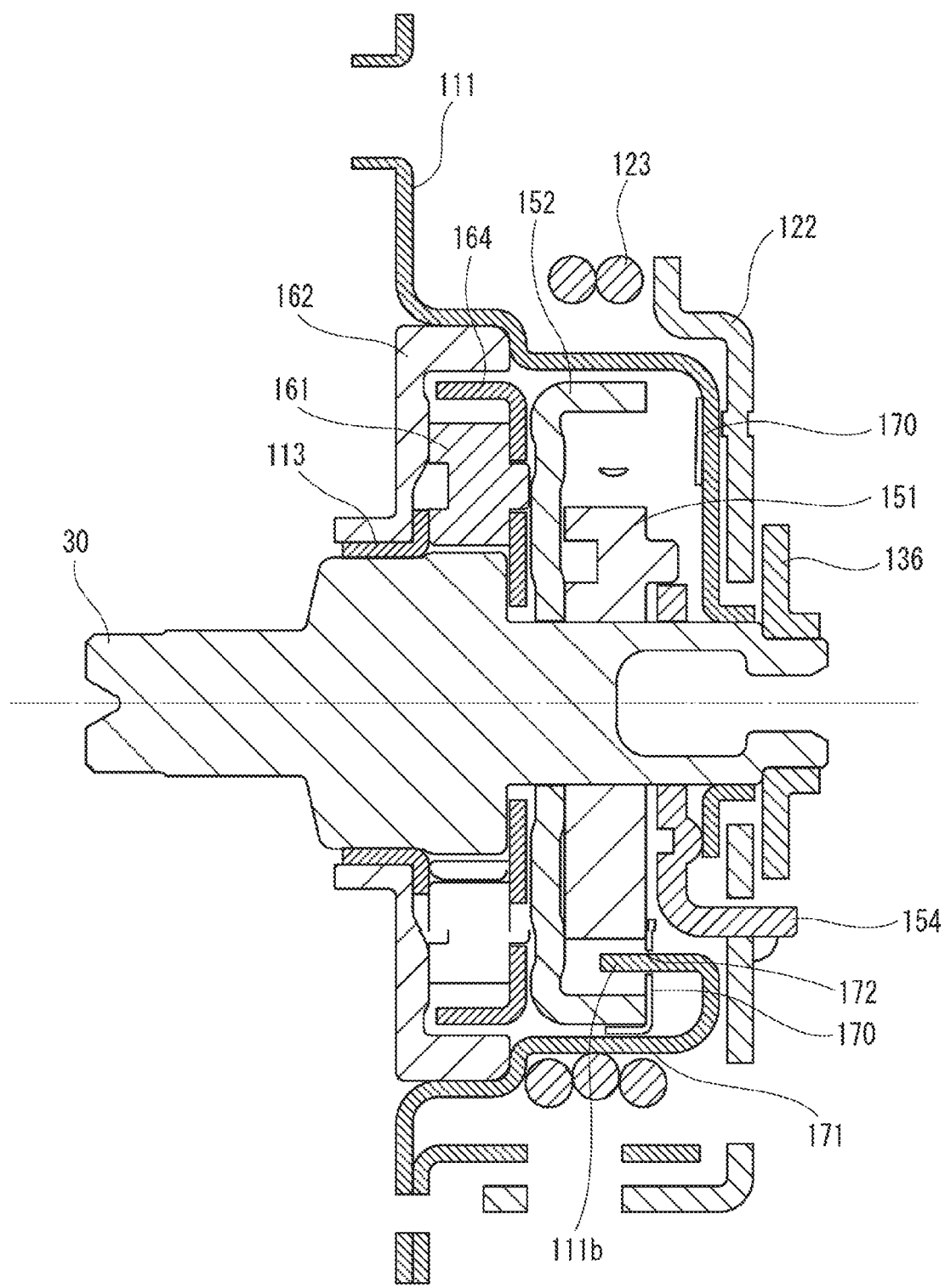
FIG. 13 is a cross-sectional view of the vehicle clutch unit illustrated in FIG. 12 when viewed along the axial direction.

FIG. 12 is an exploded perspective view of a vehicle clutch unit 200 according to a modification of the present invention. FIG. 13 is a cross-sectional view of the vehicle clutch unit 200 illustrated in FIG. 12 when viewed along the axial direction. Reference numerals indicating components of the vehicle clutch unit 200 according to the modification are set by adding 100 to the reference numerals indicating the components of the vehicle clutch unit 100 according to the above-described embodiment.

As illustrated in FIGS. 12 and 13, the vehicle clutch unit 200 includes a bottomed cylindrical housing 111 which accommodates an input-side clutch 150.

An input-side outer-ring member 152 (the other member of the inner-ring member and the outer-ring member) of the input-side clutch 150 includes a rotation transmitting part 152*a* which is rotated together with the input-side outer-ring member 152 and transmits the rotation of the input-side outer-ring member 152 to an output-side clutch 160. The rotation transmitting part 152*a* is provided in the end surface of the input-side outer-ring member 152 on the axial output side. The rotation transmitting parts 152*a* are provided in three places to be separated in the circumferential direction. The rotation transmitting part 152*a* is a protrusion part which extends toward the output side in the axial direction.

The rotation transmitting part 152*a* can be engaged in a hole part 164*a* provided in a release bracket 164. When the rotation transmitting part 152*a* is engaged in the hole part 164*a*, a relative rotation between the input-side outer-ring member 152 and the release bracket 164 is transmitted to each other.

Incidentally, in the embodiment, the spline groove formed in the fixation part 52*d* of the input-side outer-ring member 52 is spline-coupled with the release bracket 64, and the relative rotation between the input-side outer-ring member 52 and the release bracket 64 of the output-side clutch 60 is transmitted to each other. In this modification, the rotation transmitting part 152*a* transmits the relative rotation between the input-side outer-ring member 152 and the release bracket 164 of the output-side clutch 160 to each other.

Incidentally, FIG. 12 illustrates an example in which the rotation transmitting part is integral with the input-side outer-ring member 152. However, the rotation transmitting part may be separate from the input-side outer-ring member 152, and for example, the rotation transmitting part is configured as a roller.

As illustrated in FIGS. 12 and 13, the vehicle clutch unit 200 includes a wave washer 170 as a rotation suppressing member. The wave washer 170 is arranged between the bottom surface 111a of the housing 111 and the input-side outer-ring member 152, and pushes the input-side outer-ring member 152 toward the output-side clutch 160.

In other words, even in the vehicle clutch unit 200 according to this modification, the wave washer 170 is provided which applies the rotational resistance force larger than the co-rotating force to between the input-side outer-ring member 152 and the member (in this modification, the housing 111) which is not rotated at the time of the returning operation of the operating lever, so as to suppress that the input-side outer-ring member 152 is co-rotated by the input-side inner-ring member 151 at the time of the returning operation of the operating lever. The wave washer 170 pushes the input-side outer-ring member 152 in the axial direction, so as to generate a force which resists the force which co-rotates the input-side outer-ring member 152. Incidentally, the wave washer 170 may be configured to contact and push directly the input-side outer-ring member 152 to the output side in the rotational axial direction, or may be configured to indirectly push the input-side outer-ring member 152 to the output side in the rotational axial direction with the member which transmits the force interposed between the wave washer 170 and the input-side outer-ring member 152.

Therefore, in the vehicle clutch unit 200 according to this modification, the rotation of the input-side outer-ring member 152 at the time of the returning operation of the operating lever is regulated. For this reason, at the time of the returning operation of the operating lever, it is suppressed that the input-side outer-ring member 152 is co-rotated by the input-side inner-ring member 151 in a returning direction. Accordingly, the responsiveness at the time of the continuous operation of the operating lever is improved.

Furthermore, since the wave washer 170 pushes the input-side outer-ring member 152 toward the output-side clutch 160, it is possible to sufficiently secure the engaging margin between the rotation transmitting part 152a provided in the axial end surface of the input-side outer-ring member 152 on the output side and the release bracket. For this reason, the locking of the output-side clutch 60 can be released reliably.

The wave washer 170 includes a suppression part 171 which can abut on the outer circumferential surface of the input-side outer-ring member 152 to suppress the radial relative movement of the wave washer 170 and the input-side outer-ring member 152. Regulation parts 171 are provided in three places which are separate in the circumferential direction of the outer circumferential edge of the almost annular wave washer 170. The suppression part 171 is a claw part which extends toward the output side. The suppression part 171 abuts on the outer circumferential surface of the input-side outer-ring member 152 to regulate the radial relative movement of the wave washer 170 and the input-side outer-ring member 152. According to the vehicle clutch unit 200 of this modification, it is possible to position the wave washer 170 radially with respect to the input-side outer-ring member 152.

Incidentally, the regulation part 171 and the outer circumferential surface of the input-side outer-ring member 152 may be configured to abut on each other typically. Otherwise, although the clearance occurs at the non-operation time between the regulation part 171 and the outer circumferential surface of the input-side outer-ring member 152, the regulation part 171 and the outer circumferential surface of the input-side outer-ring member 152 may be configured to abut on each other by removing the clearance at the time of the operation that suppresses the radial relative movement.

In the vehicle clutch unit 200 of this modification, the wave washer 170 as a rotation suppressing member includes a crest part and a valley part along the circumferential direction.

The input-side clutch 150 is provided between the input-side inner-ring member 151 and the input-side outer-ring member 152, and includes an input-side clutch roller 155 which transmits the rotational movement therebetween. The input-side clutch roller 155 is positioned by the crest part and the valley part of the wave washer 170 in the circumferential direction. The input-side clutch roller 155 is arranged in the gap between the wave washer 170 and the input-side outer-ring member 152 formed by the crest part. The displacement of the input-side clutch roller 155 in the axial direction is regulated by the tilted surface forming the crest part.

According to the vehicle clutch unit 200 of this modification, the wave washer 170 also functions as a member for positioning the input-side clutch roller 155 in the circumferential direction, and thus the number of the components can be reduced compared to a case where a member for positioning the input-side clutch roller 155 in the circumferential direction is provided additionally.

In the vehicle clutch unit 200 of this modification, an engagement structure is provided in which the wave washer 170 and the housing 111 are engaged with each other to regulate the relative displacement thereof in the circumferential direction. In this modification, the engagement structure is formed by a hole part 172 of the wave washer 170 and the claw part 111b of the housing 111.

The wave washer 170 includes the hole parts 172 in three places in the circumferential direction. In the housing 111, the claw part 111b which protrudes toward the axial direction is formed in a position corresponding to the hole part 172. The claw part 111b of the housing 111 passes through the hole part 172 of the wave washer 170. Accordingly, it is regulated that the wave washer 170 is displaced with respect to the housing 111 in the circumferential direction.

Incidentally, instead of the hole part 172, a notch part formed by notching part of the inner circumferential portion of the wave washer 170 may regulate the relative displacement of the housing 111 and the wave washer 170 in the circumferential direction.

According to the vehicle clutch unit 200 of this modification, it is possible to regulate that the wave washer 170 is relatively rotated with respect to the housing 111, and thus the rotation of the wave washer 170 itself is regulated to easily improve the responsiveness of the displacement of the vehicle seat with respect to the operation of the operating lever.

The present application is based on Japanese Patent Application (No. 2015-247655) filed Dec. 18, 2015 and Japanese Patent Application (No. 2016-148811) filed Jul. 28, 2016, the entire contents of which are incorporated herein by reference.

INDUSTRIAL APPLICABILITY

According to the present invention, the vehicle clutch unit is provided in which the responsiveness of the displacement of the vehicle seat with respect to the operation of the operating lever is further improved.

REFERENCE SIGNS LIST

11: Housing, 11a: Bottom surface, 21: Operating lever, 30: Output shaft member, 40: Vehicle seat, 50: Input-side clutch, 51: Input-side inner-ring member, 52: Input-side outer-ring member, 55: Input-side clutch roller (Input-side transmission member), 60: Output-side clutch, 61: Output-side inner-ring member, 62: Output-side outer-ring member, 64: Release bracket (Rotation transmitting part), 65: Output-side clutch roller (Output-side transmission member), 66: Output-side roller biasing spring (Elastic member), 70: Rotation suppressing member, 100: Vehicle clutch unit

The invention claimed is:

1. A clutch unit for a vehicle seat, comprising:
an operating lever which is rotatable about a rotational shaft and is returnable to a neutral position;
an output shaft member, which is rotatable about the rotational shaft and outputs an operational force input to the operating lever to the vehicle seat;
an input-side clutch, which includes: an inner-ring member and an outer-ring member that are provided coaxially with the rotational shaft and into which the output shaft member is inserted; and an input-side transmission member that is arranged between an outer circumferential surface of the inner-ring member and an inner circumferential surface of the outer-ring member;
an output-side clutch,
wherein the input-side clutch is configured to
transmit a rotation of the operating lever to the output-side clutch in such a manner that one member of the inner-ring member and the outer-ring member is rotated with the rotation of the operating lever, and the other member of the inner-ring member and the outer-ring member is rotated via the input-side transmission member,
input the rotation of the operating lever to the output-side clutch at a time of a driving operation in which the operating lever is driven from the neutral position, and
return the operating lever to the neutral position while holding a rotation position of the output shaft member at a time of a returning operation in which the operating lever returns to the neutral position after being driven,
wherein the output-side clutch is configured to
regulate the rotation of the output shaft member due to a force input to the output shaft member from a vehicle seat side, and
allow the rotation of the output shaft member in response to the rotation of the operating lever being transmitted by the other member of the input-side clutch, and
wherein a rotation suppressing member is provided to apply a rotational resistance force that is larger than a co-rotating force to between the other member and a member which is not rotated at the time of the returning operation of the operating lever, so as to suppress the other member from co-rotating by the one member at the time of the returning operation of the operating lever to the neutral position; and
a bottomed cylindrical housing, which accommodates the input-side clutch, wherein
the rotation suppressing member pushes the other member toward a bottom surface of the housing.

2. A clutch unit for a vehicle seat, comprising:
an operating lever which is rotatable about a rotational shaft and is returnable to a neutral position;
an output shaft member, which is rotatable about the rotational shaft and outputs an operational force input to the operating lever to the vehicle seat;
an input-side clutch, which includes: an inner-ring member and an outer-ring member that are provided coaxially with the rotational shaft and into which the output shaft member is inserted; and an input-side transmission member that is arranged between an outer circumferential surface of the inner-ring member and an inner circumferential surface of the outer-ring member;
an output-side clutch,
wherein the input-side clutch is configured to
transmit a rotation of the operating lever to the output-side clutch in such a manner that one member of the inner-ring member and the outer-ring member is rotated with the rotation of the operating lever, and the other member of the inner-ring member and the outer-ring member is rotated via the input-side transmission member,
input the rotation of the operating lever to the output-side clutch at a time of a driving operation in which the operating lever is driven from the neutral position, and
return the operating lever to the neutral position while holding a rotation position of the output shaft member at a time of a returning operation in which the operating lever returns to the neutral position after being driven,
wherein the output-side clutch is configured to
regulate the rotation of the output shaft member due to a force input to the output shaft member from a vehicle seat side, and
allow the rotation of the output shaft member in response to the rotation of the operating lever being transmitted by the other member of the input-side clutch,
wherein a rotation suppressing member is provided to apply a rotational resistance force that is larger than a co-rotating force to between the other member and a member which is not rotated at the time of the returning operation of the operating lever, so as to suppress the other member from co-rotating by the one member at the time of the returning operation of the operating lever to the neutral position, and wherein
the other member includes
a rotation transmitting part, which is rotated together with the other member to transmit the rotation to the output-side clutch, and
the rotation suppressing member pushes the rotation transmitting part toward an output side in a rotational axial direction.

3. The vehicle clutch unit according to claim 2, further comprising:
a bottomed cylindrical housing, which accommodates the input-side clutch, wherein
the rotation suppressing member pushes the other member toward a bottom surface of the housing, and
the rotation suppressing member is positioned between the other member and the rotation transmitting part.

4. The vehicle clutch unit according to claim 2, wherein the output-side clutch includes
an output-side inner-ring member and an output-side outer-ring member, which are provided coaxially with the rotational shaft,
an output-side transmission member, which is arranged between an outer circumferential surface of the output-side inner-ring member and an inner circumferential surface of the output-side outer-ring member, and
an elastic member, which is arranged between the outer circumferential surface of the output-side inner-ring member and the inner circumferential surface of the output-side outer-ring member and which generates an elastic force to push the output-side transmission member such that the output-side transmission member moves together with the rotation transmitting part at the time of the returning operation of the operating lever to the neutral position.

5. A clutch unit for a vehicle seat, comprising:
an operating lever which is rotatable about a rotational shaft and is returnable to a neutral position;
an output shaft member, which is rotatable about the rotational shaft and outputs an operational force input to the operating lever to the vehicle seat;
an input-side clutch, which includes: an inner-ring member and an outer-ring member that are provided coaxially with the rotational shaft and into which the output shaft member is inserted; and an input-side transmission member that is arranged between an outer circumferential surface of the inner-ring member and an inner circumferential surface of the outer-ring member;
an output-side clutch,
wherein the input-side clutch is configured to
transmit a rotation of the operating lever to the output-side clutch in such a manner that one member of the inner-ring member and the outer-ring member is rotated with the rotation of the operating lever, and the other member of the inner-ring member and the outer-ring member is rotated via the input-side transmission member,
input the rotation of the operating lever to the output-side clutch at a time of a driving operation in which the operating lever is driven from the neutral position, and
return the operating lever to the neutral position while holding a rotation position of the output shaft member at a time of a returning operation in which the operating lever returns to the neutral position after being driven,
wherein the output-side clutch is configured to
regulate the rotation of the output shaft member due to a force input to the output shaft member from a vehicle seat side, and
allow the rotation of the output shaft member in response to the rotation of the operating lever being transmitted by the other member of the input-side clutch, and
wherein a rotation suppressing member is provided to apply a rotational resistance force that is larger than a co-rotating force to between the other member and a member which is not rotated at the time of the returning operation of the operating lever, so as to suppress the other member from co-rotating by the one member at the time of the returning operation of the operating lever to the neutral position; and
a bottomed cylindrical housing, which accommodates the input-side clutch, wherein
the other member of the inner-ring member and the outer-ring member includes a rotation transmitting part, which is provided integrally or separately and is rotated together with the other member to transmit the rotation of the other member to the output-side clutch, and
the rotation suppressing member pushes the other member toward a bottom surface of the housing.

6. The vehicle clutch unit according to claim 5, wherein the rotation suppressing member includes a suppression part, which is capable of abutting on an outer circumferential surface of the other member and suppresses a radial relative movement of the rotation suppressing member and the other member.

7. The vehicle clutch unit according to claim 5, wherein the rotation suppressing member comprises a wave washer having a crest part and a valley part along a circumferential direction,
the input-side clutch includes a roller which is provided between the inner-ring member and the outer-ring member and transmits a rotational movement between the inner-ring member and the outer-ring member, and
the roller is arranged to be overlapped with the crest part of the rotation suppressing member in an axial direction.

8. The vehicle clutch unit according to claim 7, wherein the rotation suppressing member and the housing include an engagement structure in which the rotation suppressing member and the housing are engaged to each other to regulate a relative displacement of the rotation suppressing member and the housing in the circumferential direction.

\* \* \* \* \*